United States Patent
Allen et al.

(10) Patent No.: US 9,868,816 B2
(45) Date of Patent: *Jan. 16, 2018

(54) ALIPHATIC POLYCARBONATE QUENCH METHOD

(71) Applicant: Saudi Aramco Technologies Company, Dhahran (SA)

(72) Inventors: Scott D. Allen, Ithaca, NY (US);
Jeffrey R. Conuel, Ithaca, NY (US);
David E. Decker, Ithaca, NY (US);
Anna E. Cherian, Ithaca, NY (US)

(73) Assignee: Saudi Aramco Technologies Company, Dharan (SA)

( * ) Notice: Subject to any disclaimer, the term of this patent is extended or adjusted under 35 U.S.C. 154(b) by 0 days.

This patent is subject to a terminal disclaimer.

(21) Appl. No.: 14/643,057

(22) Filed: Mar. 10, 2015

(65) Prior Publication Data
US 2015/0361215 A1 Dec. 17, 2015

Related U.S. Application Data

(63) Continuation of application No. 13/119,407, filed as application No. PCT/US2009/057324 on Sep. 17, 2009, now Pat. No. 9,012,675.
(Continued)

(51) Int. Cl.
*C07C 69/96* (2006.01)
*C08G 64/02* (2006.01)
(Continued)

(52) U.S. Cl.
CPC ......... *C08G 64/0208* (2013.01); *C08G 64/34* (2013.01); *C08G 64/406* (2013.01)

(58) Field of Classification Search
USPC .......... 558/277, 260; 568/905; 528/395, 405
See application file for complete search history.

(56) References Cited

U.S. PATENT DOCUMENTS 4,177,343 A 12/1979 Pannell
5,294,356 A 3/1994 Tanaka et al.
(Continued)

FOREIGN PATENT DOCUMENTS

| CN | 1060478 A | 4/1992 |
| CN | 1257885 A | 6/2000 |

(Continued)

OTHER PUBLICATIONS

Hinchcliffe, A. et al., QuadraPure Cartridges for Removal of Trace Metal from Reaction Mixtures in Flow, Organic Process Research and Development, 11:477-481 (2007).
(Continued)

*Primary Examiner* — Shane Fang
(74) *Attorney, Agent, or Firm* — Choate, Hall & Stewart LLP; Charles E. Lyon

(57) ABSTRACT

The present disclosure is directed to, in part, an aliphatic polycarbonate polymerization reaction initiated by combining an epoxide with carbon dioxide in the presence of a catalytic transition metal-ligand complex to form a reaction mixture, and further quenching that polymerization reaction by contacting the reaction mixture with an acid containing a non-nucleophilic anion produces a crude polymer solution with improved stability and processability.

37 Claims, 9 Drawing Sheets

Related U.S. Application Data

(60) Provisional application No. 61/101,173, filed on Sep. 30, 2008, provisional application No. 61/097,725, filed on Sep. 17, 2008.

(51) Int. Cl.
*C08G 64/34* (2006.01)
*C08G 64/40* (2006.01)

(56) References Cited

U.S. PATENT DOCUMENTS

| | | | |
|---|---|---|---|
| 5,420,241 | A | 5/1995 | Fennhoff et al. |
| 5,476,602 | A | 12/1995 | Tanaka et al. |
| 5,637,739 | A | 6/1997 | Jacobsen et al. |
| 5,663,393 | A | 9/1997 | Jacobsen et al. |
| 5,665,890 | A | 9/1997 | Jacobsen et al. |
| 5,750,772 | A | 5/1998 | Gridnev |
| 5,929,232 | A | 7/1999 | Jacobsen et al. |
| 6,130,340 | A | 10/2000 | Jacobsen et al. |
| 6,309,997 | B1 | 10/2001 | Fujita et al. |
| 6,617,467 | B1 | 9/2003 | Muller et al. |
| 6,639,087 | B2 | 10/2003 | Larrow et al. |
| 6,844,448 | B2 | 1/2005 | Jacobsen et al. |
| 6,860,004 | B2 | 3/2005 | Hirano et al. |
| 6,870,004 | B1 * | 3/2005 | Nguyen ............... C08G 64/34 525/88 |
| 6,884,750 | B2 | 4/2005 | Kim et al. |
| 6,903,043 | B2 | 6/2005 | Kim et al. |
| 7,145,022 | B2 | 12/2006 | Luinstra et al. |
| 7,220,870 | B2 | 5/2007 | Jacobsen et al. |
| 7,244,805 | B2 | 7/2007 | Park et al. |
| 7,304,172 | B2 | 12/2007 | Coates et al. |
| 7,858,729 | B2 | 12/2010 | Allen |
| 8,163,867 | B2 | 4/2012 | Lee et al. |
| 8,207,365 | B2 | 6/2012 | Zheng et al. |
| 8,232,267 | B2 | 7/2012 | Groves |
| 8,252,891 | B2 | 8/2012 | Cherian et al. |
| 8,252,955 | B2 | 8/2012 | Gao et al. |
| 8,461,290 | B2 | 6/2013 | Carpentier et al. |
| 8,507,733 | B2 | 8/2013 | Ok et al. |
| 8,598,309 | B2 | 12/2013 | Jeong et al. |
| 8,642,721 | B2 | 2/2014 | Ok et al. |
| 8,791,274 | B2 | 7/2014 | Ok et al. |
| 9,012,675 | B2 | 4/2015 | Allen et al. |
| 2004/0260049 | A1 | 12/2004 | Miyamoto et al. |
| 2006/0089252 | A1 | 4/2006 | Coates et al. |
| 2007/0255039 | A1 | 11/2007 | Coates et al. |
| 2008/0108499 | A1 | 5/2008 | Coates et al. |
| 2009/0306336 | A1 * | 12/2009 | Luinstra ............... C08G 64/34 528/414 |
| 2010/0256329 | A1 | 10/2010 | Nozaki et al. |
| 2011/0201779 | A1 | 8/2011 | Cherian et al. |
| 2011/0207899 | A1 | 8/2011 | Allen et al. |
| 2014/0249279 | A1 | 9/2014 | Williams et al. |

FOREIGN PATENT DOCUMENTS

| | | |
|---|---|---|
| CN | 1583825 A | 2/2005 |
| CN | 1865311 A | 11/2006 |
| CN | 1887934 A | 1/2007 |
| CN | 101020747 A | 8/2007 |
| CN | 101412809 A | 4/2009 |
| EP | 0504410 A1 | 9/1992 |
| EP | 2146977 B1 | 11/2012 |
| EP | 2257559 B1 | 10/2014 |
| JP | S60-238319 A | 11/1985 |
| JP | H02-166101 A | 6/1990 |
| JP | H04-142330 A | 5/1992 |
| JP | H06-11788 B2 | 2/1994 |
| JP | H10-025339 A | 1/1998 |
| JP | 2000-163808 A | 6/2000 |
| JP | 2002-284820 A | 10/2002 |
| JP | 2006-052416 A | 2/2006 |
| JP | 2008-081515 A | 4/2008 |
| JP | 2008081518 A | 4/2008 |
| KR | 10-0981270 B1 | 9/2010 |
| WO | WO-96/28402 A1 | 9/1996 |
| WO | WO-98/04538 A1 | 2/1998 |
| WO | WO-2003/029325 A1 | 4/2003 |
| WO | WO-2006/061237 A1 | 6/2006 |
| WO | WO-2008/136591 A1 | 11/2008 |
| WO | WO-2008/150033 A1 | 12/2008 |
| WO | WO-2009/102078 A1 | 8/2009 |
| WO | WO-2009/137540 A1 | 11/2009 |
| WO | WO-2010/022388 A2 | 2/2010 |
| WO | WO-2010/028362 A1 | 3/2010 |
| WO | WO-2010/033703 A1 | 3/2010 |
| WO | WO-2010/033705 A1 | 3/2010 |

OTHER PUBLICATIONS

International Preliminary Report on Patentability for PCT/US2009/057320, (dated Mar. 31, 2011).

International Search Report for PCT/US2009/057320, (dated Dec. 15, 2010).

Lu, X-B. et al., Design of Highly Active Binary Catalyst Systems for CO2/Epoxide Copolymerization: Polymer Selectivity, Enantioselectivity, and Stereochemistry Control, J. Am. Chem. Soc., 128: 1664-1674 (2006).

Nakano, K. et al., Selective formation of polycarbonate over cyclic carbonate: copolymerization of epoxides with carbon dioxide catalyzed by a cobalt(III) complex with a piperidinium end-capping arm, Angew Chem Int Ed Engl., 45(43): 7274-7277 (2006).

Sijith, S. et al., A Highly Active and Recycle Catalytic System for CO$_2$/Propylene Oxide Copolymerization, Angewandte Chemie International Edition, 47:1-5 (2008).

Third Party Observation against EP2342258A1 pursuant to Article 115 EPC, dated Apr. 23, 2012.

Written Opinion for PCT/US2009/057320, 4 pages (dated Dec. 15, 2010).

U.S. Appl. No. 12/129,106, Allen.

U.S. Appl. No. 61/187,750, Allen et al.

International Search Report for PCT/US2009/057324, 5 pages (dated Nov. 24, 2009).

Luinstra, G.A., Poly(Propylene Carbonate), Old Copolymers of Propylene Oxide and Carbon Dioxide with New Interests: Catalysis and Material Properties, Polymer Reviews, 48:192-219 (2008).

Wilen, S.H. et al., Strategies in Optical Resolutions, Tetrahedron, 33: 2725-2736 (1977).

Written Opinion for PCT/US2009/057324, 6 pages, (dated Dec. 16, 2009).

* cited by examiner

ALIPHATIC POLYCARBONATE QUENCH METHOD

This application is a Continuation Application of U.S application Ser. No. 13/119,407 filed on Mar. 16, 2011, which is a National Phase Application under 35 U.S.C. §371 of International PCT Application No. PCT/US09/57324, filed Sep. 17, 2009, which claims priority to United States Provisional Patent Application Ser. No. 61/101,173, filed Sep. 30, 2008 and United States Provisional Patent Application Ser. No. 61/097,725, filed Sep. 17, 2008. The entire content of each priority application is incorporated herein by reference.

BACKGROUND

Aliphatic polycarbonates (APCs) are biocompatible and biodegradable materials with numerous uses ranging from high-performance applications in material science to use as biodegradable consumer packaging. APCs having two carbon atoms separating the carbonate moieties are typically made by the copolymerization of an aliphatic oxide and $CO_2$. Such polymerization reactions are typically initiated through the use of a catalyst, and therefore, require a quenching step to terminate the resulting copolymerization. Thus, there is a need for improved methods for making APCs and improved methods for quenching the copolymerization reaction that form such APCs.

SUMMARY

Catalytic transition metal-ligand complexes, for example cobalt salen complexes, can be used to catalyze aliphatic polycarbonate (APC) polymerization reactions. Previously such polymerization reactions have typically been quenched by addition of carboxylic acids such as acetic acid, or with mineral acids such as HCl. In many such cases, a large molar excess of these reagents is required to provide a stable polymer product. If a large excess of acid is not used in the quench, the crude reaction mixtures may be unstable and show decomposition or molecular weight degradation upon standing or heating during subsequent polymer isolation steps. On the other hand, the presence of large amounts of acid can also have undesirable consequences for subsequent isolation and purification steps. Therefore, in certain situations it may be desirable to use a quenching agent that does not require a molar excess, or as large a molar excess relative to the catalyst utilized in the polymerization.

In general, aliphatic polycarbonate polymerization reactions involve three stages: an initiating stage, a polymerization stage, and a quenching stage. Herein we describe agents that are useful for the quenching stage that do not require a large molar excess of the quenching agent relative to the catalyst used in the reaction. In particular, the present disclosure encompasses methods including the steps of initiating a polycarbonate polymerization reaction by combining an epoxide with carbon dioxide in the presence of a catalytic transition metal-ligand complex, allowing the copolymerization to proceed until a desired polymer molecular weight is achieved, and then quenching that polymerization reaction by contacting the reaction mixture with an acid containing a non-nucleophilic anion. In certain embodiments, this process produces a crude polymer solution with improved stability and processability, and thus possesses a greater utility use in commercial scale production of APCs.

In another aspect, the present disclosure provides a method comprising initiating an aliphatic polycarbonate polymerization reaction by combining an epoxide with carbon dioxide in the presence of a catalytic transition metal-ligand complex, allowing the copolymerization to proceed until a desired polymer molecular weight is achieved, and then quenching the polymerization reaction by contacting the reaction mixture with an acid wherein the catalytic transition metal-ligand complex comprises a first ligand that is a polymerization initiator and at least one additional ligand that is not a polymerization initiator, and wherein the acid contains an anion that is not a polymerization initiator.

In another aspect, the present disclosure provides a method comprising initiating an aliphatic polycarbonate polymerization reaction by combining an epoxide with carbon dioxide in the presence of a catalytic transition metal-ligand complex, wherein the catalytic transition metal-ligand complex comprises a first ligand that is a polymerization initiator, and at least one additional ligand that is not a polymerization initiator, allowing the copolymerization to proceed until a desired polymer molecular weight is achieved, and then quenching the polymerization reaction by contacting the reaction mixture with a combination of an acid and a quench ligand that is not a polymerization initiator, wherein the quench ligand has a higher affinity for the transition metal of transition metal-ligand complex than the polycarbonate chain and the anion of the acid do.

While the various aspects of the disclosure herein are illustrated through the use of cobalt salen catalysts, it is an object of the present disclosure to extend the synthetic procedures and related methodologies to catalytic systems utilizing complexes of other transition metals, from different Groups in the Periodic Table. For example, the transition metal may be chosen from different Groups of transition metals, e.g., Group 6, Group 7, Group 9, Group 12, etc. Exemplary transition metals may include chromium (Cr), manganese (Mn), molybdenum (Mo), cadmium (Cd), or other transition metal catalysts. Various other metal-centered complexes as described herein would be known to those skilled in the art made aware of this disclosure. While such systems may not show optimal results with respect to any one synthetic pathway, it can be a matter of routine experimentation to achieve desired catalytic activities. Accordingly, as described more fully below, in the accompanying figures, examples and descriptions, a related object of this disclosure includes various transition metal-ligand complexes, the choice as to which can be determined as desirable for a specific end use application.

While the various aspects of this disclosure herein are illustrated through the use of sulfonic acids, it is an object of the present disclosure to extend the synthetic procedures and related methodologies to quench catalytic systems utilizing various non-nucleophilic acids. Various other non-nucleophilic acids as described herein would be known to those skilled in the art made aware of this disclosure. While such systems may not show optimal results with respect to any one synthetic pathway, it can be a matter of routine experimentation to achieve desired quenching activities. Accordingly, as described more fully below, in the accompanying figures, examples and descriptions, a related object of this disclosure includes various non-nucleophilic acids, the choice as to which can be determined as desirable for a specific end use application.

This application refers to various issued patents, published patent applications, journal articles, and other publications, all of which are incorporated herein by reference.

The details of one or more embodiments of the disclosure are set forth herein. Other features, objects, and advantages of the disclosure will be apparent from the description, the figures, the examples, and the claims.

DEFINITIONS

Definitions of specific functional groups and chemical terms are described in more detail below. For purposes of this disclosure, the chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3$^{rd}$ Edition, Cambridge University Press, Cambridge, 1987; the entire contents of each of which are incorporated herein by reference.

Certain compounds of the present invention can comprise one or more asymmetric centers, and thus can exist in various stereoisomeric forms, e.g., enantiomers and/or diastereomers. Thus, inventive compounds and compositions thereof may be in the form of an individual enantiomer, diastereomer or geometric isomer, or may be in the form of a mixture of stereoisomers. In certain embodiments, the compounds of the invention are enantiopure compounds. In certain other embodiments, mixtures of enantiomers or diastereomers are provided.

Furthermore, certain compounds, as described herein, may have one or more double bonds that can exist as either a Z or E isomer, unless otherwise indicated. The invention additionally encompasses the compounds as individual isomers substantially free of other isomers and alternatively, as mixtures of various isomers, e.g., racemic mixtures of enantiomers. In addition to the above-mentioned compounds per se, this invention also encompasses compositions comprising one or more compounds.

As used herein, the term "isomers" includes any and all geometric isomers and stereoisomers. For example, "isomers" include cis- and trans-isomers, E- and Z-isomers, R- and S-enantiomers, diastereomers, (D)-isomers, (L)-isomers, racemic mixtures thereof, and other mixtures thereof, as falling within the scope of the invention. For instance, a compound may, in some embodiments, be provided substantially free of one or more corresponding stereoisomers, and may also be referred to as "stereochemically enriched."

Where a particular enantiomer is preferred, it may, in some embodiments be provided substantially free of the opposite enantiomer, and may also be referred to as "optically enriched." "Optically enriched," as used herein, means that the compound is made up of a significantly greater proportion of one enantiomer. In certain embodiments the compound is made up of at least about 90% by weight of an enantiomer. In some embodiments the compound is made up of at least about 95%, 97%, 98%, 99%, 99.5%, 99.7%, 99.8%, or 99.9% by weight of an enantiomer. In some embodiments the enantiomeric excess of provided compounds is at least about 90%, 95%, 97%, 98%, 99%, 99.5%, 99.7%, 99.8%, or 99.9%. In some embodiments, enantiomers may be isolated from racemic mixtures by any method known to those skilled in the art, including chiral high pressure liquid chromatography (HPLC) and the formation and crystallization of chiral salts or prepared by asymmetric syntheses. See, for example, Jacques, et al., Enantiomers, Racemates and Resolutions (Wiley Interscience, New York, 1981); Wilen, S. H., et al., *Tetrahedron* 33:2725 (1977); Eliel, E. L. *Stereochemistry of Carbon Compounds* (McGraw-Hill, NY, 1962); Wilen, S. H. *Tables of Resolving Agents and Optical Resolutions* p. 268 (E. L. Eliel, Ed., Univ. of Notre Dame Press, Notre Dame, Ind. 1972).

The terms "halo" and "halogen" as used herein refer to an atom selected from fluorine (fluoro, —F), chlorine (chloro, —Cl), bromine (bromo, —Br), and iodine (iodo, —I).

The term "aliphatic" or "aliphatic group," as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. As used herein the terms "aliphatic" or "aliphatic group", also encompass partially fluorinated and perfluoro analogs of these moieties where at least one of the hydrogen atoms of the aliphatic group is replaced by a fluorine atom. Unless otherwise specified, aliphatic groups contain 1-12 carbon atoms. In certain embodiments, aliphatic groups contain 1-8 carbon atoms. In certain embodiments, aliphatic groups contain 1-6 carbon atoms. In some embodiments, aliphatic groups contain 1-5 carbon atoms, in some embodiments, aliphatic groups contain 1-4 carbon atoms, in yet other embodiments aliphatic groups contain 1-3 carbon atoms, and in yet other embodiments aliphatic groups contain 1-2 carbon atoms. Suitable aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "heteroaliphatic," as used herein, means aliphatic groups wherein one or more carbon atoms are independently replaced by one or more of oxygen, sulfur, nitrogen, or phosphorus. In certain embodiments, one or two carbon atoms are independently replaced by one or more of oxygen, sulfur, nitrogen, or phosphorus. Heteroaliphatic groups may be substituted or unsubstituted, branched or unbranched, cyclic or acyclic, and include "heterocycle," "hetercyclyl," "heterocycloaliphatic," or "heterocyclic" groups.

The term "epoxide," as used herein, refers to a substituted or unsubstituted oxirane. Substituted oxiranes include monosubstituted oxiranes, disubstituted oxiranes, trisubstituted oxiranes, and tetrasubstituted oxiranes. Such epoxides may be further optionally substituted as defined herein. In certain embodiments, epoxides comprise a single oxirane moiety. In certain embodiments, epoxides comprise two or more oxirane moieties.

The term "polymer," as used herein, refers to a molecule of high relative molecular mass, the structure of which comprises the multiple repetition of units derived, actually or conceptually, from molecules of low relative molecular mass. In certain embodiments, a polymer is comprised of only one monomer species (e.g., polyethylene oxide). In certain embodiments, a polymer of the present invention is a copolymer, terpolymer, heteropolymer, block copolymer, or tapered heteropolymer of one or more epoxides.

The term "unsaturated," as used herein, means that a moiety has one or more double or triple bonds.

The term "cycloaliphatic," used alone or as part of a larger moiety, refer to saturated or partially unsaturated cyclic aliphatic monocyclic, bicyclic, or polycyclic ring systems, as described herein, having from 3 to 14 members, wherein the aliphatic ring system is optionally substituted as defined above and described herein. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, norbornyl, adamantyl, and cyclooctadienyl. In some embodiments, the cycloalkyl has 3-6 carbons. The terms "cycloaliphatic," may also include aliphatic rings that are fused to one or more aromatic or nonaromatic rings, such as decahydronaphthyl or tetrahydronaphthyl, where the radical or point of attachment is on the aliphatic ring. In some embodiments, a carbocyclic groups is bicyclic. In some embodiments, a carbocyclic group is tricyclic. In some embodiments, a carbocyclic group is polycyclic.

The term "alkyl," as used herein, refers to saturated, straight- or branched-chain hydrocarbon radicals derived by removal of a single hydrogen atom from an aliphatic moiety containing between one and twelve carbon atoms. Unless otherwise specified, alkyl groups contain 1-12 carbon atoms. In certain embodiments, alkyl groups contain 1-8 carbon atoms. In certain embodiments, alkyl groups contain 1-6 carbon atoms. In some embodiments, alkyl groups contain 1-5 carbon atoms, in some embodiments, alkyl groups contain 1-4 carbon atoms, in yet other embodiments alkyl groups contain 1-3 carbon atoms, and in yet other embodiments alkyl groups contain 1-2 carbon atoms. Examples of alkyl radicals include, but are not limited to, methyl, ethyl, n-propyl, isopropyl, n-butyl, iso-butyl, sec-butyl, sec-pentyl, iso-pentyl, tert-butyl, n-pentyl, neopentyl, n-hexyl, sec-hexyl, n-heptyl, n-octyl, n-decyl, n-undecyl, dodecyl, and the like.

The term "alkenyl," as used herein, denotes a monovalent group derived from a straight or branched-chain aliphatic moiety having at least one carbon-carbon double bond Unless otherwise specified, alkenyl groups contain 2-12 carbon atoms. In certain embodiments, alkenyl groups contain 2-8 carbon atoms. In certain embodiments, alkenyl groups contain 2-6 carbon atoms. In some embodiments, alkenyl groups contain 2-5 carbon atoms, in some embodiments, alkenyl groups contain 2-4 carbon atoms, in yet other embodiments alkenyl groups contain 2-3 carbon atoms, and in yet other embodiments alkenyl groups contain 2 carbon atoms. Alkenyl groups include, for example, ethenyl, propenyl, butenyl, butadienyl, 1-methyl-2-buten-1-yl, and the like.

The term "alkynyl," as used herein, refers to a monovalent group derived from a straight- or branched-chain aliphatic moiety having at least one carbon-carbon triple bond Unless otherwise specified, alkynyl groups contain 2-12 carbon atoms. In certain embodiments, alkynyl groups contain 2-8 carbon atoms. In certain embodiments, alkynyl groups contain 2-6 carbon atoms. In some embodiments, alkynyl groups contain 2-5 carbon atoms, in some embodiments, alkynyl groups contain 2-4 carbon atoms, in yet other embodiments alkynyl groups contain 2-3 carbon atoms, and in yet other embodiments alkynyl groups contain 2 carbon atoms. Representative alkynyl groups include, but are not limited to, ethynyl, 2-propynyl (propargyl), 1-propynyl, and the like.

The term "carbocycle" and "carbocyclic ring" as used herein, refers to monocyclic and polycyclic moieties wherein the rings contain only carbon atoms. Unless otherwise specified, carbocycles may be saturated, partially unsaturated or aromatic, and contain 3 to 20 carbon atoms. In some embodiments, a carbocycle is aliphatic. Representative carbocyles include cyclopropane, cyclobutane, cyclopentane, cyclohexane, bicyclo[2.2.1]heptane, norbornene, phenyl, cyclohexene, naphthalene, and spiro[4.5]decane.

The term "aryl" used alone or as part of a larger moiety as in "aralkyl," "aralkoxy," or "aryloxyalkyl," refers to monocyclic and polycyclic ring systems having a total of five to 20 ring members, wherein at least one ring in the system is aromatic and wherein each ring in the system contains three to twelve ring members. The term "aryl" may be used interchangeably with the term "aryl ring." In certain embodiments of the present invention, "aryl" refers to an aromatic ring system which includes, but is not limited to, phenyl, biphenyl, naphthyl, anthracyl and the like, which may bear one or more substituents. Also included within the scope of the term "aryl," as it is used herein, is a group in which an aromatic ring is fused to one or more additional rings, such as benzofuranyl, indanyl, phthalimidyl, naphthimidyl, phenantriidinyl, or tetrahydronaphthyl, and the like.

The terms "heteroaryl" and "heteroar-," used alone or as part of a larger moiety, e.g., "heteroaralkyl" or "heteroaralkoxy," refer to groups having 5 to 14 ring atoms, preferably 5, 6, or 9 ring atoms; having 6, 10, or 14 π electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of a basic nitrogen. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, benzofuranyl and pteridinyl. The terms "heteroaryl" and "heteroar-", as used herein, also include groups in which a heteroaromatic ring is fused to one or more aryl, cycloaliphatic, or heterocyclyl rings, where the radical or point of attachment is on the heteroaromatic ring. Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3(4H)-one. A heteroaryl group may be mono- or bicyclic. The term "heteroaryl" may be used interchangeably with the terms "heteroaryl ring," "heteroaryl group," or "heteroaromatic," any of which terms include rings that are optionally substituted. The term "heteroaralkyl" refers to an alkyl group substituted by a heteroaryl, wherein the alkyl and heteroaryl portions independently are optionally substituted.

As used herein, the terms "heterocycle," "heterocyclyl," "heterocyclic radical," and "heterocyclic ring" are used interchangeably and refer to a stable 5- to 7-membered monocyclic or 7-14-membered bicyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl), or $^+$NR (as in N-substituted pyrrolidinyl).

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothienyl, pyrrolidinyl, pyrrolidonyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle," "heterocyclyl," "heterocyclyl ring," "heterocyclic group," "heterocyclic moiety," and "heterocyclic radical" are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be mono- or bicyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

As described herein, compounds of the invention may contain "optionally substituted" moieties. In general, the term "substituted," whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable," as used herein, refers to compounds that are not substantially altered when subjected to conditions to allow for their production, detection, and, in certain embodiments, their recovery, purification, and use for one or more of the purposes disclosed herein.

In some chemical structures herein, substituents are shown attached to a bond which crosses a bond in a ring of the depicted molecule. This means that one or more of the substituents may be attached to the ring at any available position (usually in place of a hydrogen atom of the parent structure). In cases where an atom of a ring so substituted has two substitutable positions, two groups may be present on the same ring atom. When more than one substituent is present, each is defined independently of the others, and each may have a different structure. In cases where the substituent shown crossing a bond of the ring is —R, this has the same meaning as if the ring were said to be "optionally substituted" as described in the preceding paragraph.

Suitable monovalent substituents on a substitutable carbon atom of an "optionally substituted" group are independently halogen; —(CH$_2$)$_{0-4}$R°; —(CH$_2$)$_{0-4}$OR°; —(CH$_2$)$_{0-4}$OSi(R°)$_3$; —O—(CH$_2$)$_{0-4}$C(O)OR°; —(CH$_2$)$_{0-4}$CH(OR°)$_2$; —(CH$_2$)$_{0-4}$SR°; —(CH$_2$)$_{0-4}$Ph, which may be substituted with R°; —(CH$_2$)$_{0-4}$O(CH$_2$)$_{0-1}$Ph which may be substituted with R°; —CH=CHPh, which may be substituted with R°; —NO$_2$; —CN; —NCO; —N$_3$; —(CH$_2$)$_{0-4}$N(R°)$_2$; —(CH$_2$)$_{0-4}$N(R$^{602}$)C(O)R°; —N(R°)C(S)R°; —(CH$_2$)$_{0-4}$N(R°)C(O)NR°$_2$; —N(R°)C(S)NR°$_2$; —(CH$_2$)$_{0-4}$N(R°)C(O)OR°; —N(R°)N(R°)C(O)R°; —N(R°)N(R°)C(O)NR°$_2$; —N(R°)N(R°)C(O)OR°; —(CH$_2$)$_{0-4}$C(O)R°; —C(S)R°; —(CH$_2$)$_{0-4}$C(O)OR°; —(CH$_2$)$_{0-4}$C(O)SR°; —(CH$_2$)$_{0-4}$C(O)OSiR°$_3$; —(CH$_2$)$_{0-4}$OC(O)R°; —OC(O)(CH$_2$)$_{0-4}$SR—, SC(S)SR°; —(CH$_2$)$_{0-4}$SC(O)R°; —(CH$_2$)$_{0-4}$C(O)NR°$_2$; —C(S)NR°$_2$; —C(S)SR°; —SC(S)SR°, —(CH$_2$)$_{0-4}$OC(O)NR°$_2$; —C(O)N(OR°)R°; —C(O)C(O)R°; —C(O)CH$_2$C(O)R°; —C(NOR°)R°; —(CH$_2$)$_{0-4}$SSR°; —(CH$_2$)$_{0-4}$S(O)$_2$R°; —(CH$_2$)$_{0-4}$S(O)$_2$OR°; —(CH$_2$)$_{0-4}$OS(O)$_2$R°; —S(O)$_2$NR°$_2$; —(CH$_2$)$_{0-4}$S(O)R°; —N(R°)S(O)$_2$NR°$_2$; —N(R°)S(O)$_2$R°; —N(OR°)R°; —C(NH)NR°$_2$; —P(O)$_2$R°; —P(O)R°$_2$; —OP(O)R°$_2$; —OP(O)(OR°)$_2$; SiR°$_3$; —(C$_{1-4}$ straight or branched alkylene)O—N(R°)$_2$; or —(C$_{1-4}$ straight or branched alkylene)C(O)O—N(R°)$_2$, wherein each R° may be substituted as defined below and is independently hydrogen, C$_{1-6}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur, or, notwithstanding the definition above, two independent occurrences of R$^{602}$, taken together with their intervening atom(s), form a 3-12-membered saturated, partially unsaturated, or aryl mono- or bicyclic ring having 0-4 heteroatoms independently selected from nitrogen, oxygen, or sulfur, which may be substituted as defined below.

Suitable monovalent substituents on R° (or the ring formed by taking two independent occurrences of R° together with their intervening atoms), are independently halogen, —(CH$_2$)$_{0-2}$R$^\bullet$, -(haloR$^\bullet$), —(CH$_2$)$_{0-2}$OH, —(CH$_2$)$_{0-2}$OR$^\bullet$, —(CH$_2$)$_{0-2}$CH(OR$^\bullet$)$_2$; —O(haloR$^\bullet$), —CN, —N$_3$, —(CH$_2$)$_{0-2}$C(O)R$^\bullet$, —(CH$_2$)$_{0-2}$C(O)OH, —(CH$_2$)$_{0-2}$C(O)OR$^\bullet$, —(CH$_2$)$_{0-2}$SR$^\bullet$, —(CH$_2$)$_{0-2}$SH, —(CH$_2$)$_{0-2}$NH$_2$, —(CH$_2$)$_{0-2}$NHR$^\bullet$, —(CH$_2$)$_{0-2}$NR$^\bullet$$_2$, —NO$_2$, —SiR$^\bullet$$_3$, —OSiR$^\bullet$$_3$, —C(O)SR$^\bullet$, —(C$_{1-4}$ straight or branched alkylene)C(O)OR$^\bullet$, or —SSR$^\bullet$ wherein each R$^\bullet$ is unsubstituted or where preceded by "halo" is substituted only with one or more halogens, and is independently selected from C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur. Suitable divalent substituents on a saturated carbon atom of R° include =O and =S.

Suitable divalent substituents on a saturated carbon atom of an "optionally substituted" group include the following: =O, =S, =NNR*$_2$, =NNHC(O)R*, =NNHC(O)OR*, =NNHS(O)$_2$R*, =NR*, =NOR*, —O(C(R*$_2$))$_{2-3}$O—, or —S(C(R*$_2$))$_{2-3}$S—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —O(CR*$_2$)$_{2-3}$O—, wherein each independent occurrence of R* is selected from hydrogen, C$_1$-6 aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R* include halogen, —R$^\bullet$, -(haloR$^\bullet$), —OH, —OR$^\bullet$, —O(haloR$^\bullet$), —CN, —C(O)OH, —C(O)OR$^\bullet$, —NH$_2$, —NHR$^\bullet$, —NR$^\bullet$$_2$, or —NO$_2$, wherein each R$^\bullet$ is unsubstituted or where preceded by "halo" is substituted only with one or more halogens, and is independently C$_1$-4 aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —R$^†$, —NR$^†_2$, —C(O)R$^†$, —C(O)OR$^†$, —C(O)C(O)R$^†$, —C(O)CH$_2$C(O)R$^†$, —S(O)$_2$R$^†$, —S(O)$_2$NR$^†_2$, —C(S)NR$^†_2$, —C(NH)NR$^†_2$, or —N(R$^†$)S(O)$_2$R$^†$; wherein each R$^†$ is independently hydrogen, C$_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of R$^†$, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of R$^†$ are independently halogen, —R$^●$, -(haloR$^●$), —OH, —OR$^●$, —O(haloR$^●$), —CN, —C(O)OH, —C(O)OR$^●$, —NH$_2$, —NHR$^●$, —NR$^●_2$, or —NO$_2$, wherein each R$^●$ is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

The term "dope" or "polymer dope" as used herein refers to a crude product of a polymerization reaction. It will be appreciated by one skilled in the art that such a dope can be stored or subjected to further processing such as catalyst removal, devolatilization, precipitation, etc.

As used herein, the term "catalyst" refers to a substance the presence of which increases the rate of a chemical reaction, while not being consumed or undergoing a permanent chemical change itself.

"Tetradentate" refers to ligands having four sites capable of coordinating to a metal center.

As used herein, the term "nucleophile" refers to any agent that can ring open an epoxide.

As used herein, the term "polymerization initiator" refers to an agent that can initiate formation of a polymer chain by reacting with another species present in a polymerization reaction.

As used herein, the term "nucleophilic ligand" refers to a ligand that can ring-open an epoxide.

As used herein, the term "salen" refers to any ligand derived from 2 equivalents of salicylaldehyde and one equivalent of a diamine, or two equivalents of one or more monoamines.

As used herein, the term "porphyrin" refers to any tetradentate ligand derived from four optionally substituted pyrroline subunits interconnected at their a carbon atoms via optionally substituted methine bridges (=CR$^●$—)

As used herein, the term "solid support" refers to a soluble or insoluble polymeric structure, such as crosslinked polystyrene, or an inorganic structure, e.g., of silica or alumina.

DETAILED DESCRIPTION OF CERTAIN EMBODIMENTS

Figure 1:
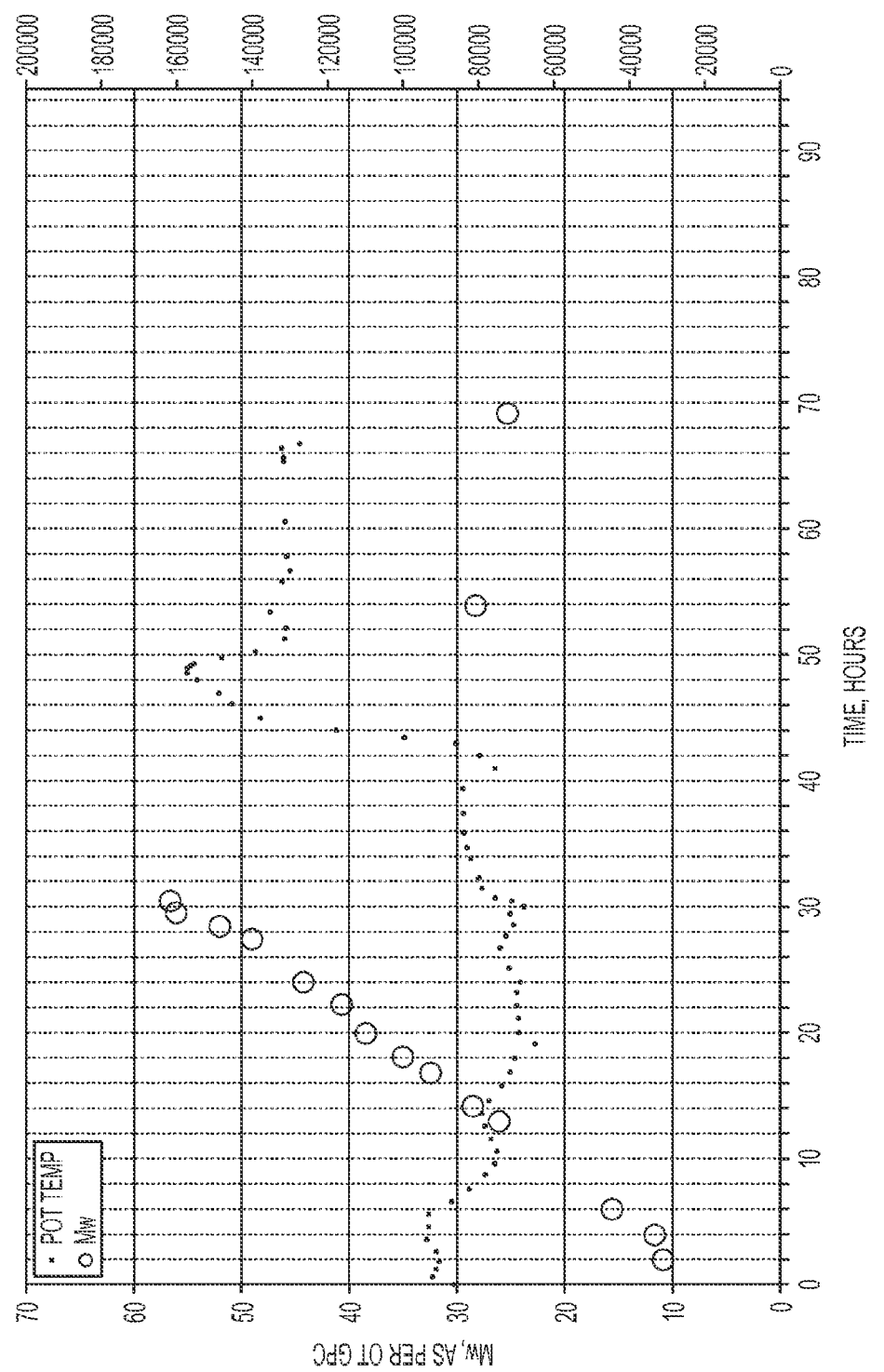
FIG. 1 depicts a graph of the molecular weight change of a poly(propylene carbonate) solution after performing a quench and a dilute step in a 400-gallon reactor.

As generally described above, the present disclosure provides a method that comprises the steps of initiating an aliphatic polycarbonate (APC) polymerization reaction by combining an epoxide with carbon dioxide in the presence of a catalytic transition metal-ligand complex, allowing the polymerization reaction to proceed for a period of time to form a reaction mixture comprising a polycarbonate chain, and quenching the polymerization reaction by contacting the reaction mixture with an acid containing an anion that is not a polymerization initiator.

In certain embodiments, the present disclosure also provides a method that comprises the steps of initiating an aliphatic polycarbonate polymerization reaction by combining an epoxide with carbon dioxide in the presence of a catalytic transition metal-ligand complex, allowing the reaction to proceed for a period of time to form a reaction mixture comprising a polycarbonate chain, and quenching the polymerization reaction by adding to the reaction mixture a chain transfer agent and a ligand, wherein: the added ligand is not a polymerization initiator it has a higher affinity for the transition metal of the transition metal-ligand complex than does either of the polycarbonate chain, or the chain transfer agent.

In certain embodiments, the catalytic transition metal-ligand complex comprises at least one ligand that is a polymerization initiator and at least one ligand that is not a polymerization initiator, as described in detail below.

I. Initiating the Aliphatic Polycarbonate Polymerization Reaction

In one aspect, the present disclosure provides a method that comprises the steps of initiating an aliphatic polycarbonate (APC) polymerization reaction by combining an epoxide with carbon dioxide in the presence of a catalytic transition metal-ligand complex, allowing the polymerization reaction to proceed for a period of time to form a reaction mixture comprising a polycarbonate chain. It will be appreciated by one skilled in the art that a variety of epoxides and catalytic transition metal complexes can be used in the disclosed methods.

For example, one skilled in the art could use any of the epoxides described in co-pending U.S. Provisional application Ser. No. 61/187,750, the entire content of which is incorporated herein by reference.

In certain embodiments, the epoxide is selected from ethylene oxide, monosubstituted alkyl epoxides, 1,2 disubstituted alkyl epoxides, 1,1-disubstituted epoxides, and polycyclic epoxides.

In certain embodiments, the epoxide is selected from ethylene oxide, propylene oxide, epichlorohydrin, glycidyl ethers, glycidyl esters, 1,2-butylene oxide, 2,3-butylene oxide, cyclopentene oxide, cyclohexene oxide, 3-vinyl cyclohexene oxide, cyclooctene oxide, norbornene oxide, and limonene oxide.

In certain embodiments, the epoxide is propylene oxide.

In certain embodiments, the catalytic transition metal-ligand complex comprises at least one ligand that is a polymerization initiator and at least one ligand that is not a polymerization initiator.

In certain embodiments, the catalytic transition metal-ligand complex comprises a transition metal M. In certain embodiments M is a Group 4 transition metal. In certain embodiments, M is titanium. In certain embodiments, M is a Group 6 transition metal. In certain embodiments, M is molybdenum. In certain embodiments, M is chromium. In certain embodiments, M is a Group 7 transition metal. In certain embodiments, M is manganese. In certain embodiments, M is a Group 8 transition metal. In certain embodiments, M is ruthenium. In certain embodiments, M is a Group 9 transition metal. In certain embodiments, M is cobalt. In certain embodiments, wherein M is cobalt, the cobalt has a valency of +3 (i.e., Co(III)). In certain embodiments, M is a Group 12 transition metal. In certain embodiments, M is cadmium. In certain embodiments, M is zinc. In certain embodiments, M is in Group 13. In certain embodiments, M is aluminum.

In certain embodiments, the catalytic transition metal-ligand complex comprises at least one ligand that is a polymerization initiator. In certain embodiments, the ligand that is a polymerization initiator is a nucleophilic ligand.

In certain embodiments, each nucleophilic ligand is denoted $X^1$ or $X^2$, (as the valency of M permits). In certain embodiments one nucleophilic ligand is present and is denoted $X^1$. In certain embodiments, a second nucleophilic ligand is present and is denoted $X^2$.

In certain embodiments, as valency of M permits, one or both of $X^1$ and $X^2$ are present and each is independently selected from the group consisting of $—OR^x$, $—SR^x$, $—O(C=O)R^x$, $—O(C=O)OR^x$, $—O(C=O)N(R^x)_2$, $—N(R^x)(C=O)R^x$, $—NC$, $—CN$, halo (e.g., $—Br$, $—I$, $—Cl$), $—N_3$, and $PR^x_3$, wherein each $R^x$ is, independently, selected from hydrogen, optionally substituted aliphatic, optionally substituted heteroaliphatic, optionally substituted aryl and optionally substituted heteroaryl.

In certain embodiments, $X^1$ and $X^2$ are each, independently $—O(C=O)R^x$, wherein $R^x$ is selected from optionally substituted aliphatic, optionally substituted heteroaliphatic, optionally substituted aryl, and optionally substituted heteroaryl.

In certain embodiments, $X^1$ and/or $X^2$ are each, independently $—O(C=O)R^x$, wherein $R^x$ is optionally substituted alkyl. In certain embodiments, $X^1$ and $X^2$ are each, independently $—O(C=O)CH_3$ or $—O(C=O)CF_3$.

Furthermore, in certain embodiments, $X^1$ and/or $X^2$ are each, independently $—O(C=O)R^x$, wherein $R^x$ is optionally substituted aryl or heteroaryl. In certain embodiments, X is $—O(C=O)R^x$, wherein $R^x$ is optionally substituted aryl. In certain embodiments, $X^1$ and $X^2$ are $—O(C=O)R^x$, wherein $R^x$ is optionally substituted phenyl. In certain embodiments, $X^1$ and $X^2$ are each, independently $—O(C=O)C_6H_5$ or $—O(C=O)C_6F_5$.

In certain embodiments, $X^1$ and $X^2$ are each, independently $—OR^x$, wherein $R^x$ is selected from optionally substituted aliphatic, optionally substituted heteroaliphatic, optionally substituted aryl, and optionally substituted heteroaryl.

For example, in certain embodiments, $X^1$ and $X^2$ are each, independently $—OR^x$, wherein $R^x$ is optionally substituted aryl. In certain embodiments, $X^1$ and $X^2$ are each, independently $—OR^x$, wherein $R^x$ is optionally substituted phenyl. In certain embodiments, $X^1$ and $X^2$ are each, independently $—OC_6H_5$ or $—OC_6H_2(2,4-NO_2)$.

In certain embodiments, $X^1$ and $X^2$ are each, independently halo. In certain embodiments, $X^1$ and/or $X^2$ are $—Br$. In certain embodiments, $X^1$ and/or $X^2$ are $—Cl$. In certain embodiments, $X^1$ and/or $X^2$ are $—I$.

In certain embodiments, $X^1$ and/or $X^2$ are $—N_3$.
In certain embodiments, $X^1$ and/or $X^2$ are $—NC$.
In certain embodiments, $X^1$ and/or $X^2$ are $—CN$.

In certain embodiments, $X^1$ and $X^2$ are both present and $X^1$ is as defined above, while $X^2$ is a coordinating solvent molecule such as an ether.

In certain embodiments, at least one ligand is not a polymerization initiator. In certain embodiments, the ligand that is not a polymerization initiator is a polydentate ligand. In certain embodiments, the polydentate ligand is a salen ligand.

In certain embodiments, the salen ligand has the formula:

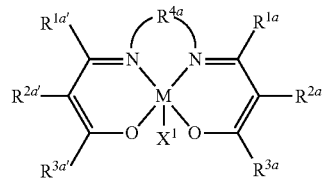

wherein:
M is a metal atom,
$R^{1a}$, $R^{1a'}$, $R^{3a}$, and $R^{3a'}$ are independently a $—\!\!\!\sim\!\!\!(Z')_m$ group, hydrogen, or an optionally substituted radical selected from the group consisting of $C_{1-20}$ aliphatic;

$C_{1-20}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur; and 4- to 7-membered heterocyclic;

$R^{2a}$, $R^{2a'}$, are independently a —$\sim\sim\sim$ $(Z')_m$ group, hydrogen, halogen, —OR, —NR$_2$, —SR, —CN, —NO$_2$, —SO$_2$R, —SOR, —SO$_2$NR$_2$; —CNO, —NRSO$_2$R, —NCO, —N$_3$, —SiR$_3$; or an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur; and 4- to 7-membered heterocyclic;

each R is independently hydrogen, an optionally substituted group selected the group consisting of acyl; carbamoyl; arylalkyl; 6- to 10-membered aryl; $C_{1-12}$ aliphatic; $C_{1-12}$ heteroaliphatic; 5- to 10-membered heteroaryl having 1-4 heteroatoms independently selected from the group consisting of nitrogen, oxygen, and sulfur; 4- to 7-membered heterocyclyl; an oxygen protecting group; and a nitrogen protecting group; or:

two R groups are taken with intervening atoms to form an optionally substituted ring;

wherein any of [$R^{2a'}$ and $R^{3a'}$], [$R^{2a}$ and $R^{3a}$], [$R^{1a}$ and $R^{2a}$], and [$R^{1a'}$ and $R^{2a'}$] may optionally be taken together with intervening atoms to form one or more rings which may in turn be substituted with one or more $R^{20a}$ groups; and $R^{4a}$ is selected from the group consisting of:

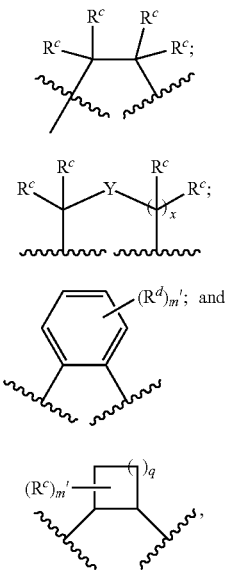

where
$R^c$ at each occurrence is independently a —$\sim\sim\sim$ $(Z')_m$ group, hydrogen, halogen, —OR, —NR$_2$, —SR, —CN, —NO$_2$, —SO$_2$R, —SOR, —SO$_2$NR$_2$; —CNO, —NRSO$_2$R, —NCO, —N$_3$, —SiR$_3$; or an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur; and 4- to 7-membered heterocyclic;

where:
two or more $R^c$ groups may be taken together with intervening atoms to form one or more rings;

when two $R^c$ groups are attached to the same carbon atom, they may be taken together along with the carbon atom to which they are attached to form a moiety selected from the group consisting of: a 3- to 8-membered spirocyclic ring, a carbonyl, an oxime, a hydrazone, an imine;

$X^1$ is a nucleophile capable of ring opening an epoxide;

Y is a divalent linker selected from the group consisting of: —NR—, —N(R)C(O)—, —C(O)NR—, —O—, —C(O)—, —OC(O)—, —C(O)O—, —S—, —SO—, —SO$_2$—, —C(=S)—, —C(=NR)—, or —N=N—; a polyether; a $C_3$ to $C_8$ substituted or unsubstituted carbocycle; and a $C_1$ to $C_8$ substituted or unsubstituted heterocycle;

—$\sim\sim\sim$ $(Z')$ represents one or more independently-defined co-catalyst moieties linked to the ligand via a covalent tether, where:

each Z' independently represents any moiety capable of acting as a co-catalyst in the polymerization reactions described herein. Suitable co-catalyst moieties include but are not limited to ammonium salts, phosphonium salts, arsonium salts, guanidinium salts, azonium salts, amino groups, phosphine groups, guanidine groups, amidine groups, heterocyclic groups and heteroaryl groups;

m is an integer from 1 to 4, inclusive and represents the number of Z' groups present on the tether; and —$\sim\sim\sim$ represents a covalent tether consisting of one or more atoms;

m' is 0 or an integer from 1 to 4, inclusive;
q is 0 or an integer from 1 to 4, inclusive; and
x is 0, 1, or 2.

In some embodiments, at least one of [$R^{2a}$ and $R^{3a}$] and [$R^{2a'}$ and $R^{3a'}$] are taken together to form a ring. In some embodiments, both [$R^{2a}$ and $R^{3a}$] and [$R^{2a'}$ and $R^{3a'}$] are taken together to form rings. In some embodiments, the rings formed by [$R^{2a}$ and $R^{3a}$] and [$R^{2a'}$ and $R^{3a'}$] are substituted phenyl rings.

In certain embodiments, the salen ligand has one of the following formulae:

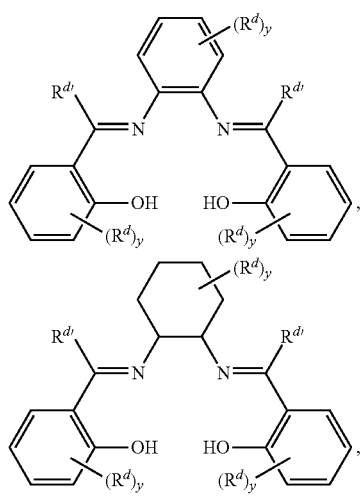

-continued

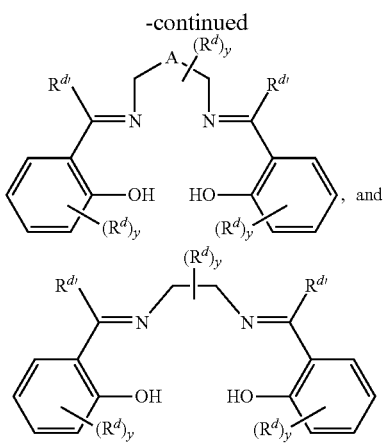
, and wherein:
R$^d$ at each occurrence is independently selected from the group consisting of a —ⵛⵛⵛ (Z')$_m$ group, optionally substituted C$_1$-C$_{20}$ aliphatic, optionally substituted C$_1$-C$_{20}$ heteroaliphatic, optionally substituted 6- to 14-membered aryl, optionally substituted 5- to 14-membered heteroaryl, halogen, —OR$^1$, —OC(O)R$^{13}$, —OC(O)OR$^{13}$, —OC(O)NR$^{11}$R$^{12}$, —CN, —CNO, —C(O)R$^{13}$, —C(R$^{13}$)$_z$H$_{(3-z)}$, —C(O)OR$^{13}$, —C(O)NR$^{11}$R$^{12}$, —NR$^{11}$R$^{12}$, —N$^+$(R$^{11}$)$_3$, —NR$^{11}$C(O)R$^{10}$, —NR$^{11}$C(O)OR$^{13}$, —NR$^{11}$SO$_2$R$^{13}$, —NCO, —N$_3$, —NO$_2$, —S(O)$_x$R$^{13}$m —SO$_2$NR$^{11}$R$^{12}$, —NO$_2$, —C(R$^{13}$)$_z$H$_{(3-z)}$, —(CH$_2$)$_k$R$^{14}$, —(CH$_2$)$_k$—Z—R$^{16}$—, and —(CH$_2$)k-Z—(CH$_2$)$_m$—R$^{14}$, where two or more suitable R$^d$ groups can be taken along with intervening atoms to form one or more rings;
R$^{d'}$ at each occurrence is independently selected from the group consisting of —H, C$_1$-C$_{12}$ alkyl, C$_2$-C$_{12}$ alkenyl, C$_2$-C$_{12}$ alkynyl, —CN, —CNO, —C(O)R$^{13}$, —C(R$^{13}$)$_z$H$_{(3-z)}$, —C(O)OR$^{13}$, —C(O)NR$^{11}$R$^{12}$, —C(R$^{13}$)$_z$H$_{(3-z)}$, —(CH$_2$)$_k$R$^{14}$, —(CH$_2$)$_k$—Z—R$^{16}$—, —(CH$_2$)$_k$—Z—(CH$_2$)$_m$—R$^{14}$, where two or more suitable R$^{d'}$ groups can be taken along with intervening atoms to form one or more rings;
A is a divalent linker selected from the group consisting of —O—, —S(O)$_x$—, —(CH$_2$)—, —C(O)—, —C(=NOR$^{10}$)—, —(C(R$^{14}$)$_x$H$_{(2-x)}$)$_k$—, a C$_3$ to C$_8$ substituted or unsubstituted carbocycle, and a C$_1$-C$_8$ substituted or unsubstituted heterocycle;
R$^{10}$ at each occurrence is independently selected from the group consisting of —H, —C(R$^{13}$)$_z$H$_{(3-z)}$, C$_1$-C$_{12}$ alkyl, C$_2$-C$_{12}$ alkenyl, C$_2$-C$_{12}$ alkynyl, up to a C$_{12}$ carbocycle, up to a C$_{12}$ heterocycle, —S(O)$_2$R$^{13}$; —Si(R$^{15}$)$_3$, and a hydroxyl protecting group;
R$^{11}$ and R$^{12}$ at each occurrence are independently selected from the group consisting of —H, optionally substituted C$_1$-C$_{20}$ aliphatic, optionally substituted C$_1$-C$_{20}$ heteroaliphatic, optionally substituted 6- to 14-membered aryl, optionally substituted 5- to 14-membered heteroaryl, and —C(R$^{13}$)$_z$H$_{(3-z)}$; wherein R$^{11}$ and R$^{12}$ when both present can optionally be taken together with the atom to which they are attached to form a 3-10-membered ring;
R$^{13}$ at each occurrence is an optionally substituted moiety independently selected from the group consisting of: —H, optionally substituted C$_1$-C$_{20}$ aliphatic, optionally substituted C$_1$-C$_{20}$ heteroaliphatic, optionally substituted 6-14-membered aryl, optionally substituted 5-14-membered heteroaryl;

R$^{14}$ at each occurrence is independently selected from the group consisting of halogen, —OR$^{10}$, —OC(O)R$^{13}$, —OC(O)OR$^{13}$, —OC(O)NR$^{11}$R$^{12}$, —CN, —CNO, —C(R$^{13}$)$_z$H$_{(3-z)}$, —C(O) R$^{13}$, —C(O)OR$^{13}$, —C(O)NR$^{11}$R$^{12}$, —NR$^{11}$R$^{12}$, —NR$^{11}$C(O)R$^{13}$, —NR$^{11}$C(O)OR$^{10}$, —NR$^{11}$SO$_2$R$^{13}$, —NCO, —N$_3$, —NO$_2$, —S(O)$_x$R$^{13}$, —SO$_2$NR$^{11}$R$^{12}$, up to a C$_{12}$ heterocycle; and up to a C$_{12}$ carbocycle;
R$^{15}$ at each occurrence is independently selected from the group consisting of C$_1$-C$_6$ alkyl, C$_2$-C$_6$ alkenyl, C$_2$-C$_6$ alkynyl, and up to C$_{12}$ substituted or unsubstituted carbocyclic;
R$^{16}$ at each occurrence is independently selected from the group consisting of C$_1$-C$_{12}$ alkyl, C$_2$-C$_{12}$ alkenyl, C$_2$-C$_{12}$ alkynyl, up to C$_{12}$ heterocylic, up to C$_{12}$ carbocyclic, and —C(R$^{13}$)$_z$H$_{(3-z)}$;
Z is a divalent linker selected from the group consisting of —(CH=CH)$_a$—, —(CH=CH)$_a$—, —C(O)—, —C(=NOR$^{11}$)—, —C(=NNR$^{11}$R$^{12}$)—, —O—, —N(R$^{11}$)—, —N(C(O)R$^{13}$)—, —S(O)—, a polyether, and a polyamine;
a is 1, 2, 3, or 4;
—ⵛⵛⵛ (Z')$_m$ represents one or more independently-defined co-catalysts moieties linked to the ligand via a covalent tether, wherein:
  each Z' independently represents any moiety capable of acting as a co-catalyst in the polymerization reactions described herein. Suitable co-catalyst moieties include but are not limited to ammonium salts, phosphonium salts, arsonium salts, guanidinium salts, azonium salts, amino groups, phosphine groups, guanidine groups, amidine groups, heterocyclic groups and heteroaryl groups;
  m is an integer from 1 to 4, inclusive and represents the number of Z' groups present on the tether; and
  —ⵛⵛⵛ represents a covalent tether consisting of one or more atoms;
k is an integer from 1 to 8 inclusive;
m is an integer from 1 to 8 inclusive;
x is 0, 1, or 2;
y is 0, 1, 2, 3, or 4; and
z is 1, 2, or 3.

In certain embodiments, the ligand is any of those disclosed in U.S. Pat. Nos. 6,860,004; 5,63,739; 7,220,870; and 7,304,172, the entirety of each of which is incorporated herein by reference.

In certain embodiments, the polydentate ligand is a porphyrin ligand.

In certain embodiments, the porphyrin ligand has the following formula:

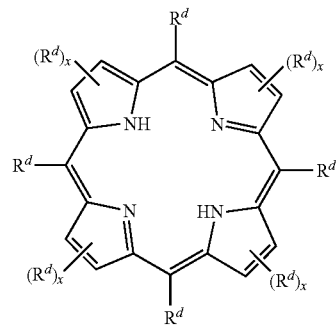

wherein:

$R^d$ at each occurrence is independently selected from the group consisting of $C_1$-$C_{12}$ alkyl, $C_2$-$C_{12}$ alkenyl, $C_2$-$C_{12}$ alkynyl, halogen, —$OR^{10}$, —$OC(O)R^{13}$, —$OC(O)OR^{13}$, —$OC(O)NR^{11}R^{12}$, —CN, —CNO, —$C(O)R^{13}$, —$C(R^{13})_zH_{(3-z)}$, —$C(O)OR^{13}$, —$C(O)NR^{11}R^{12}$, —$NR^{11}R^{12}$, —$NR^{11}C(O)R^{10}$, —$NR^{11}C(O)OR^{13}$, —$NR^{11}SO_2R^{13}$, —NCO, —$N_3$, —$NO_2$, —$S(O)_xR^{13}$m —$SO_2NR^{11}R^{12}$, —$NO_2$, —$C(R^{13})_zH_{(3-z)}$, —$(CH_2)_kR^{14}$, —$(CH_2)_k$—Z—$R^{16}$—, and —$(CH_2)_k$—Z—$(CH_2)_m$—$R^{14}$;

A is a divalent linker selected from the group consisting of —O—, —$S(O)_x$—, —$(CH_2)$—, —C(O)—, —$C(=NOR^{10})$—, —$(C(R^{14})_xH_{(2-x)})_k$—, a $C_3$ to $C_8$ substituted or unsubstituted carbocycle, and a $C_1$-$C_8$ substituted or unsubstituted heterocycle;

$R^{10}$ at each occurrence is independently selected from the group consisting of —$C(R^{13})H_{(3-z)}$, $C_1$-$C_{12}$ alkyl, $C_2$-$C_{12}$ alkenyl, $C_2$-$C_{12}$ alkynyl, up to a $C_{12}$ carbocycle, up to a $C_{12}$ heterocycle, —$S(O)_2R^{13}$; —$Si(R^{15})_3$, and a hydroxyl protecting group;

$R^{11}$ and $R^{12}$ at each occurrence are independently selected from the group consisting of —H, $C_1$-$C_{12}$ alkyl, $C_2$-$C_{12}$ alkenyl, $C_2$-$C_{12}$ alkynyl, and —$C(R^{13})_zH_{(3-z)}$; wherein $R^{11}$ and $R^{12}$ when both present can optionally be taken together with the atom to which they are attached to form a 3- to 10-membered ring;

$R^{13}$ at each occurrence is independently selected from the group consisting of: —H, b) $C_1$-$C_{12}$ alkyl, $C_2$-$C_{12}$ alkenyl, $C_2$-$C_{12}$ alkynyl, up to a $C_{12}$ carbocycle, up to a $C_{12}$ heterocycle;

$R^{14}$ at each occurrence is independently selected from the group consisting of halogen, —$OR^{10}$, —$OC(O)R^{13}$, —$OC(O)OR^{13}$, —$OC(O)NR^{11}R^{12}$, —CN, —CNO, —$C(R^{13})_zH_{(3-z)}$, —$C(O)R^{13}$, —$C(O)OR^{13}$, —$C(O)NR^{11}R^{12}$, —$NR^{11}R^{12}$, —$NR^{11}C(O)R^{13}$, —$NR^{11}C(O)OR^{10}$, —$NR^{11}SO_2R^{13}$, —NCO, —$N_3$, —$NO_2$, —$S(O)_xR^{13}$, —$SO_2NR^{11}R^{12}$, up to a $C_{12}$ heterocycle; and up to a $C_{12}$ carbocycle;

$R^{15}$ at each occurrence is independently selected from the group consisting of $C_1$-$C_6$ alkyl, $C_2$-$C_6$ alkenyl, $C_2$-$C_6$ alkynyl, and up to $C_{12}$ substituted or unsubstituted carbocyclic;

$R^{16}$ at each occurrence is independently selected from the group consisting of $C_1$-$C_{12}$ alkyl, $C_2$-$C_{12}$ alkenyl, $C_2$-$C_{12}$ alkynyl, $C_{12}$ heterocyclic, up to $C_{12}$ carbocyclic, and —$C(R^{13})_zH_{(3-z)}$;

Z is a divalent linker selected from the group consisting of —(CH=CH)$_a$—, —(CH≡CH)$_a$—, —C(O)—, —$C(=NOR^{11})$—, —$C(=NNR^{11}R^{12})$—, —O—, —$N(R^{11})$—, —$N(C(O)R^{13})$—, —$S(O)_x$—, a polyether, and a polyamine;

a is 1, 2, 3, or 4;

k is an integer from 1 to 8 inclusive;

m is an integer from 1 to 8 inclusive;

x is 0, 1, or 2;

y is 0, 1, 2, 3, or 4; and z is 1, 2, or 3.

In certain embodiments, the catalytic transition metal-ligand complex has one of the following formulae:

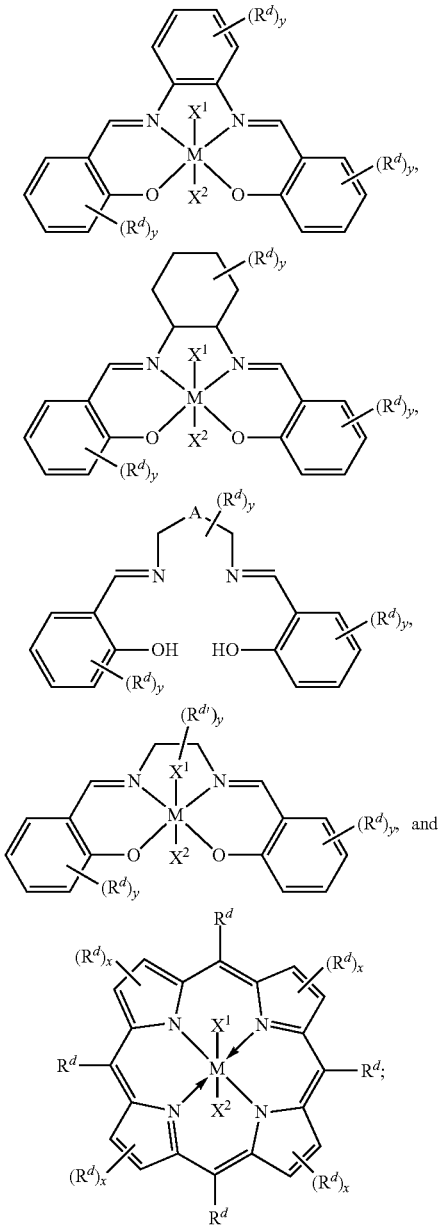

wherein, each of $R^d$, $R^{d'}$, y, A, M, $X^1$ and $X^2$ are as defined above and described in classes and subclasses above, and wherein, M is a transition metal.

In certain embodiments, the catalytic transition metal-ligand complex has one of the following formulae:

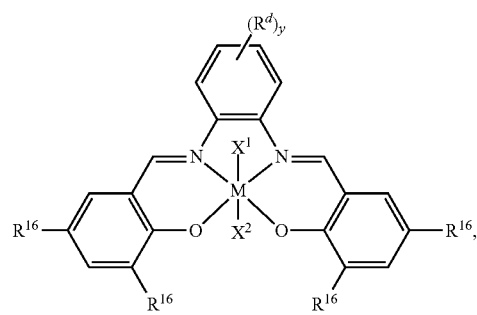

-continued

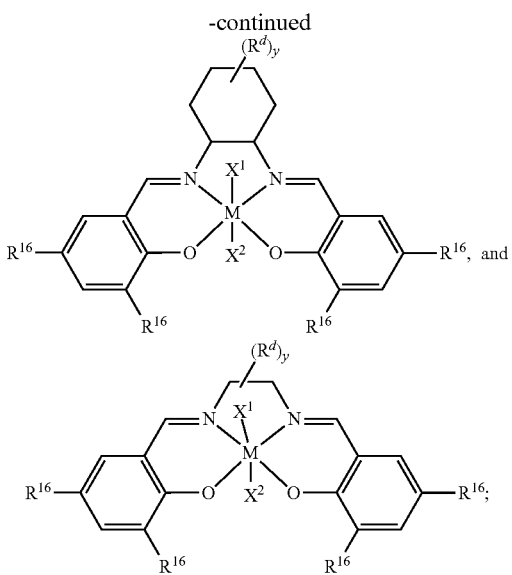

wherein, each of $R^d$, y, $R^{16}$, M, $X^1$ and $X^2$ are as defined above and described in classes and subclasses above.

In certain embodiments, $R^{16}$ at each occurrence is tert-butyl, thus forming a compound of one of the following formulae:

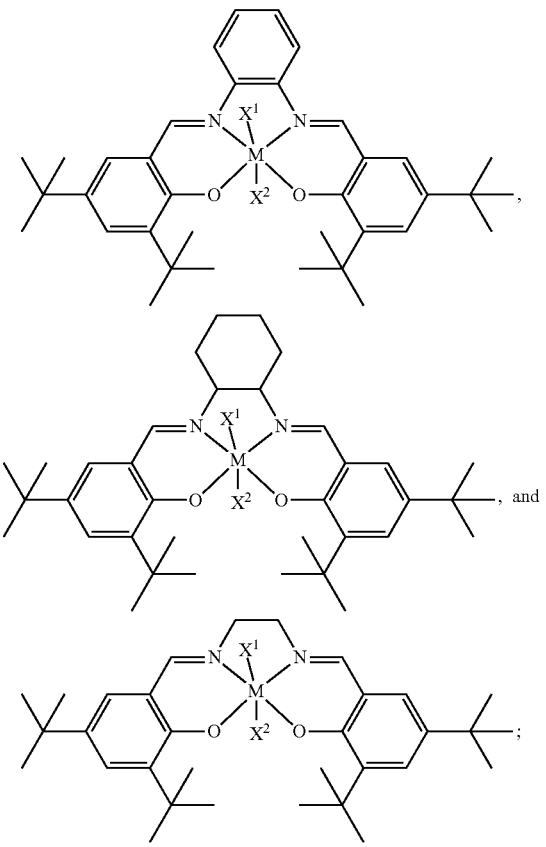

wherein, each of M, $X^1$ and $X^2$ are as defined above and described in classes and subclasses above.

In certain embodiments, any of the above methods further comprise a co-catalyst.

In certain embodiments, the co-catalyst is a Lewis base. Exemplary Lewis bases include, but are not limited to: N-methylimidazole (N-MeIm), dimethylaminopyridine (DMAP), 1,4-diazabicyclo[2.2.2]octane (DABCO), triethylamine, and diisopropylethylamine.

In certain embodiments, the co-catalyst is a salt. In certain embodiments, the co-catalyst is an ammonium salt, a phosphonium salt or an arsonium salt. In certain embodiments, the co-catalyst is an ammonium salt. Exemplary ammonium salts include, but are not limited to: (n-Bu)$_4$NCl, (n-Bu)$_4$NBr, (n-Bu)$_4$NN$_3$, [PPN]Cl, [PPN]Br, and [PPN]N$_3$, Ph$_3$PCPh$_3$]Cl [PPN]O(C=O)R$^c$ (PPN=Bis(triphenylphosphoranylidene) ammonium)). In certain embodiments, the co-catalyst is a phosphonium salt. In certain embodiments, the co-catalyst is an arsonium salt.

In certain embodiments, the co-catalyst is the ammonium salt bis(triphenylphosphoranylidene)ammonium chloride ([PPN]Cl).

In certain embodiments, the anion of the salt co-catalyst has the same structure as the ligand X of the above described metal complexes of the formula (I), or subsets thereof, wherein X is a nucleophilic ligand. For example, in certain embodiments, the co-catalyst is ([PPN]X) or (n-Bu)$_4$NX.

In certain embodiments, one skilled in the art could use any one of the catalytic transition metal-ligand complexes described in co-pending U.S. PCT Application No. PCT/US2009/054773 (described as metal complexes therein). Additional metal complexes suitable for the present invention are described in U.S. Pat. Nos. 7,304,172, 6,870,004, in U.S. Patent Application Publication No.'s US2007/0255039 and US2008/0108499, in PCT application No. PCT/US2009/042926, in PCT Publication Nos. WO2009/102078A1, WO2008150033A1, and WO2008136591A1 and in Chinese Patent Nos. CN 101412809, CN 1887934, and CN 101020747 the entire content of each of which is incorporated herein by reference.

In certain embodiments, the APC polymer is a copolymer of two or more $C_2$-$C_{12}$ epoxides and carbon dioxide. For example, the APC polymer can be a terpolymer of propylene oxide, cyclohexene oxide and carbon dioxide. In another embodiment of the present disclosure, the APC polymer is a terpolymer of ethylene oxide, propylene oxide and carbon dioxide. In another embodiment of the present disclosure, the APC polymer is a terpolymer of ethylene oxide, cyclohexene oxide and carbon dioxide. In another embodiment of the present disclosure, the APC polymer is a terpolymer of ethylene oxide, butylene oxide and carbon dioxide. In another embodiment of the present disclosure, the APC polymer is a terpolymer of butylene oxide, propylene oxide and carbon dioxide. In another embodiment of the present disclosure, the APC polymer is a terpolymer of cyclohexene oxide, butylene oxide and carbon dioxide. In another embodiment of the present disclosure, the APC polymer is a terpolymer of norbornene oxide, propylene oxide and carbon dioxide. In certain other embodiments of the present disclosure, the APC polymer is a terpolymer of propylene oxide, limonene oxide and carbon dioxide.

In certain embodiments of the present disclosure the APC polymer is a heteropolymer of three or more $C_2$ to $C_{12}$ epoxides and carbon dioxide. In certain other embodiments, the APC polymer is a heteropolymer of any three or more of the epoxides described above and carbon dioxide.

In certain embodiments, the APC polymer is a block co-polymer of two or more of any of the above-described APC compositions.

In certain embodiments, the polymers include ether linkages. Polymers in these embodiments can be mixed polyether polycarbonates, pure polyethers or block copolymers of two or more of these.

In certain embodiments, the APC polymer is a polycarbonate chain.

In certain embodiments, the polycarbonate chain is poly (propylene carbonate) (PPC).

In certain embodiments, the polycarbonate chain is poly (ethylene carbonate) (PEC).

In certain embodiments, the polycarbonate chain is poly (butylene carbonate) (PBC).

In certain embodiments, the polycarbonate chain is poly (cyclohexene carbonate) (PCHC).

In certain embodiments, the polycarbonate chain is poly (limonene carbonate) (PLC).

In certain embodiments, the polycarbonate chain is poly (norbornene carbonate) (PNC).

As shown in Scheme I below, a catalytic transition metal-ligand complex (i.e., an active catalyst) for aliphatic polycarbonate (APC) synthesis may be generated by oxidizing an inactive catalyst to obtain the active catalyst by the addition of a suitable acid to a suitable metal-ligand complex (i.e., an inactive catalyst), in the presence of oxygen. Exemplary suitable acids include acetic acid (AcOH), trifluoroacetic acid, pentafluorobenzoic acid, and others described herein. An exemplary metal-ligand complex is (salcy)Co$^{II}$. An exemplary active catalyst is (salcy)Co$^{III}$OAc. Not all acids, however, generate an active catalyst complex for a given metal/ligand combination. For example, AcOH generates an active Co$^{III}$ salen complex while TsOH generates an essentially inactive specie from the same metal ligand combination.

In certain embodiments, the reaction mixture is heated to a temperature in the range of about 35° C. to about 120° C.

In certain embodiments, the reaction mixture is heated to a temperature in the range of about 40° C. to about 100° C.

In certain embodiments, the reaction mixture is heated to a temperature in the range of about 45° C. to about 70° C.

In certain embodiments, the reaction mixture is heated under a pressure in the range of about 1 atm to about 0.05 atm.

In certain embodiments, the reaction mixture is heated under a pressure in the range of about 1 atm to about 0.001 atm.

In certain embodiments, the reaction mixture is heated under a pressure in the range of about 0.2 atm to about 0.1 atm.

In one aspect, the present disclosure provides a method which includes initiating for a polymerization reaction by combining an epoxide with carbon dioxide in the presence of a catalytic transition metal-ligand complex, and allowing the reaction to proceed for a period of time to form a reaction mixture comprising a polycarbonate chain, wherein the polymerization reaction is performed in a reactor, the method further comprising: depressurizing the reactor containing the reaction mixture, removing excess carbon dioxide from the reactor, and diluting the reaction mixture by adding a solvent prior to the quenching step.

In certain embodiments, the solvent added prior to the quenching step has a higher boiling point than the epoxide boiling point.

In certain embodiments, the solvent added prior to the quenching step is selected from ethyl acetate, n-propyl

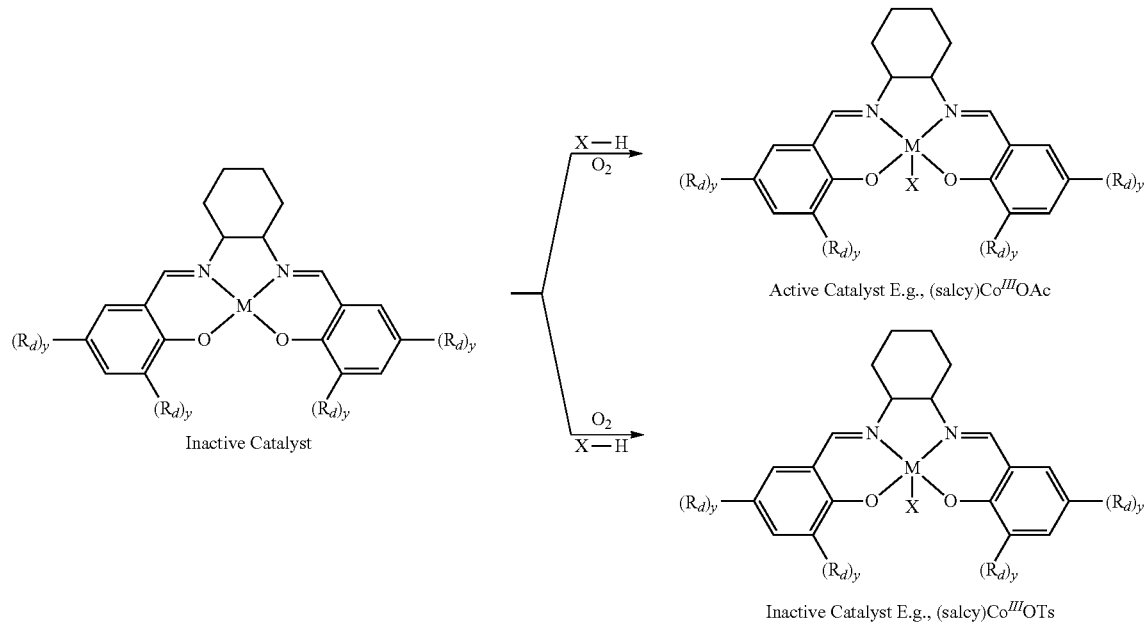

Scheme I-Exemplary Catalyst Synthesis

Once a polymerization is complete, the reaction must be quenched to decouple the APC chain from the active catalyst. If the catalyst remains attached to the polymer chain, the molecular weight of the polymer can be compromised during its isolation, either yielding broadened molecular weight distribution or complete molecular weight loss (see Schemes II, III and IV as described below).

acetate, isopropyl acetate, butyl acetate, isoamyl acetate, acetone, butanone, gamma butyrolactone, tetrahydrofuran, and mixtures of two or more of the above.

In certain embodiments, the solvent to be added for the dilution step is mixed with the quenching agent prior to addition to the polymerization reaction mixture. In certain other embodiments, the diluting solvent is added to the polymerization reaction mixture concomitantly with quenching agent.

In certain embodiments, additional heat is applied to the reactor after the quenching step is performed.

In certain embodiments, additional heat applied to the reactor after the quenching step is performed, results in removal of excess epoxide that may be present.

Methods of synthesizing a poly(ethylene carbonate) polymer from the reaction of ethylene oxide (EO) and carbon dioxide ($CO_2$) in the presence of a metal complex are described in detail in PCT Application No. PCT/US2009/04296, the entire content of which is incorporated herein by reference.

II. Quenching the Aliphatic Polycarbonate Polymerization Reaction

In one aspect, the present disclosure provides a method which includes a step subsequent of quenching the polymerization reaction by contacting the reaction mixture with an acid containing an anion that is not a polymerization initiator, as generally described in Scheme II below.

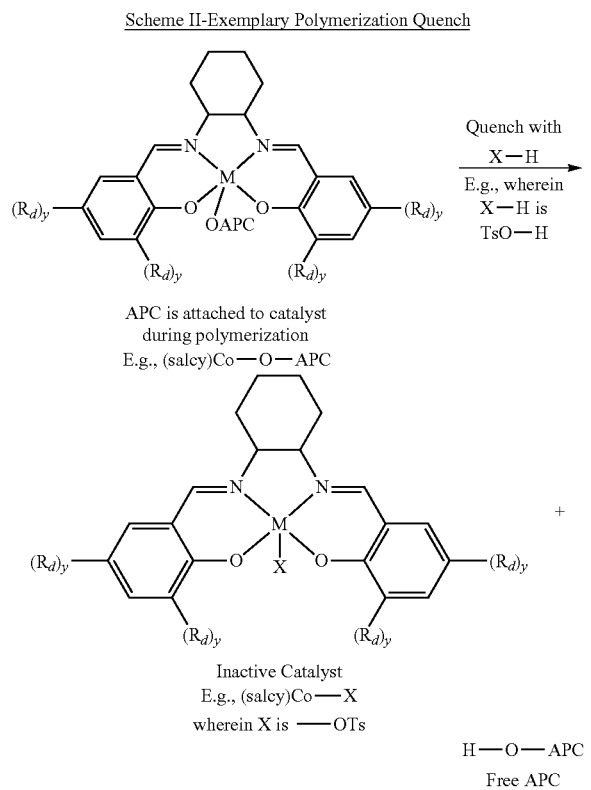

APC was isolated and processed using acetic acid (AcOH) as a quenching agent. During scale-up, where processing times and temperatures sometimes exceed the typical laboratory-scale conditions, molecular weight degradation was sometimes observed. A solution to this problem of undesired degradation was to add more quenching agent. A typical lab-scale quench used ~10-80 molar equivalents of AcOH relative to cobalt. However, to completely terminate any molecular weight degradation, 800 molar equivalents of AcOH was required. Without wishing to be bound by theory, it is believed that the catalyst-acetate complex formed by the quench reaction is in equilibrium with the catalyst-polymer complex. Once $CO_2$ is removed from the polymerization reaction, the presence of catalyst-polymer complex can lead to the scission of polymer chains. Higher concentrations of AcOH shift the equilibrium away from the catalyst-polymer complex and result in less degradation of the polymer chains.

As a result of the equilibrium conditions described above, a quenched catalyst such as a (salcy)CoOAc species for example, can be created and therefore, one skilled in art will readily determine whether such a "quenched" catalyst is desirable under the particular circumstances, given that an active catalyst can be formed, which in turn requires excess molar equivalents to sufficiently quench the reaction, as described in Scheme III below.

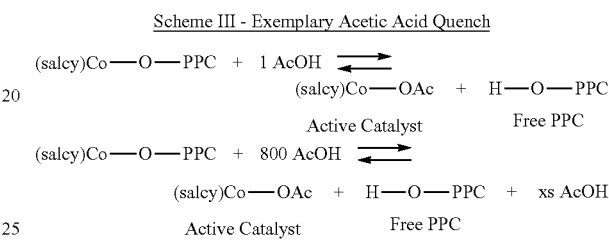

However, we have discovered that it may be desirable to use for the quenching step a different acid containing an anion that is not a polymerization initiator, and that is not therefore required in molar excess relative to the catalyst. An exemplary quenching agent of this type is a sulfonic acid. Therefore, a quenched catalyst species that does not form an equilibrium product mixture with the polymer chains in solution, and that does not form the structure of an active polymerization catalyst, may be desirable, as described in Scheme IV below.

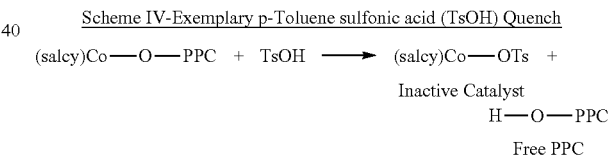

In particular, quenching with 1 equivalent of TsOH yields a thermally stable and processable reaction mixture. Without wishing to be bound by theory, it is believed that Scheme IV sets forth a possible quenching mechanism.

In certain embodiments, the acid contains a non-nucleophilic anion.

In certain embodiments, the acid is a sulfonic acid. In certain embodiments, the sulfonic acid has the formula $R^1SO_3H$, wherein $R^1$ is a radical selected from the group consisting of optionally substituted aliphatic, optionally substituted aryl, optionally substituted heterocyclic, and optionally substituted heteroaryl. In certain embodiments, $R^1$ is a radical selected from optionally substituted $C_1$ to $C_{20}$ alkyl, $C_1$ to $C_{20}$ alkenyl, and an optionally substituted phenyl.

In certain embodiments, the sulfonic acid is selected from the group consisting of p-toluene sulfonic acid (also known as PTSA or tosic acid), methane sulfonic acid, ethane sulfonic acid, 1-propane sulfonic acid, trifluoromethyl sulfonic acid, 4-nitrophenyl sulfonic acid, sulfoacetic acid, cumenesulphonic acid, xylene sulfonic acid, 3-amino-1- propanesulfonic acid, 2-(methylamino)ethanesulfonic acid, 2-aminoethanesulfonic acid, 2-sulfanylethanesulfonic acid, 3-hydroxy-1-propanesulfonic acid, benzenesulfonic acid, 3-pyridinesulfonic acid, 2-pyridinesulfonic acid, 4-piperidinesulfonic acid, 2-aminobenzenesulfonic acid, 1-methylpyridinium 3-sulfonate, 1-methyl-2-pyridiniumsulfonate, 4-hydroxybenzenesulfonic acid, cyclohexane sulfonic acid, 4-ethylbenzenesulfonic acid, 2,5-dimethylbenzenesulfonic acid, 4-methylmetanilic acid, 4-amino-3-methylbenzenesulfonic acid, 1-Naphthalenesulfonic acid, 2-amino-5-methylbenzenesulfonic acid, and perfluorooctane sulfonic acid.

In certain embodiments, the sulfonic acid is p-toluene sulfonic acid.

In certain embodiments, the quenching step of the above method comprises adding a sulfamic acid.

In certain embodiments, the quenching step of the above method comprises adding a sulfamic acid having the formula $R^1R^2N$—$SO_3H$, wherein $R^1$ and $R^2$ are radicals independently selected from the group consisting of hydrogen, optionally substituted alkyl, optionally substituted aryl, optionally substituted heterocyclyl and optionally substituted heteroaryl.

In certain embodiments, the quenching step of the above method comprises adding a phosphoric acid derivative having at least one acidic hydrogen atom.

In certain embodiments, the phosphoric acid derivative is selected from phosphoric acid, pyrophosphoric acid, triphosphoric acid, an alkyl derivative of phosphoric acid, pyrophosphoric acid, or triphosphoric acid, an aryl derivative of phosphoric acid, pyrophosphoric acid, or triphosphoric acid, and a mixture of any two or more of the above phosphoric acid derivatives.

In certain embodiments, the quenching step of the above method comprises adding a phosphoric acid having the formula:

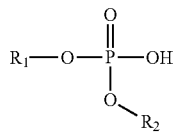

wherein, $R^1$ and $R^2$ are radicals independently selected from hydrogen, a monophosphate group, a diphosphate group, an optionally substituted alkyl, an optionally substituted aryl, an optionally substituted heterocyclic, an ester derivative of a monophosphate group, and an ester derivative of a diphosphate group.

In certain embodiments, the acid added during the quenching step is selected from the group consisting of hydrofluoric acid, fluoroboric acid, and sulfuric acid, In certain embodiments, the quenching step of the above method comprises adding an acid associated with a solid support.

In certain embodiments, the solid support is selected from an inorganic solid support and a polymeric solid support.

In certain embodiments, the inorganic solid support is selected from silica, alumina, zirconia, titania, zeolites, metal oxides, and clays.

In certain embodiments, the polymeric solid support comprises at least one of styrene, chloromethylated styrene and divynylbenzene.

In certain embodiments, the polymeric solid support is selected from polystyrenes, polysulfones, nylons, poly(chloromethylstyrene); polyolefins, polymethylmethacrylate and cross-linked ethoxylate acrylate resin polymer.

In certain embodiments, the acid containing the anion in the quenching step is added to the reaction mixture in an amount of less than 10 molar equivalents relative to the transition metal-ligand complex present in the reaction mixture.

In certain embodiments, the acid containing the anion in the quenching step is added to the reaction mixture in an amount of between 0.1 and 10 molar equivalents relative to the transition metal-ligand complex present in the reaction mixture.

In certain embodiments, the acid containing the anion in the quenching step is added to the reaction mixture in an amount of between 0.1 and 2 molar equivalents relative to the transition metal-ligand complex present in the reaction mixture.

In certain embodiments, the acid containing the anion in the quenching step is added to the reaction mixture in an amount of between 1 and 2 molar equivalents relative to the transition metal-ligand complex present in the reaction mixture.

In certain embodiments, the acid containing the anion in the quenching step is added to the reaction mixture in an amount of about 1 molar equivalent relative to the transition metal-ligand complex present in the reaction mixture.

In another aspect, the quenching step involves adding to the reaction mixture a chain transfer agent and a ligand, wherein the added ligand is not a polymerization initiator, the chain transfer agent comprises a species capable of causing the transition metal-ligand complex to dissociate from the polycarbonate chain, and the added ligand has a higher affinity for the transition metal of the transition metal-ligand complex than does either of the polycarbonate chain or chain transfer agent.

In certain embodiments, the quenching step involves adding a chain transfer agent.

In certain embodiments, the chain transfer agent is selected from water, an alcohol, a carboxylic acid, an amine, and a mercaptan. Additional chain transfer agents suitable for the present invention are described in U.S. patent application Ser. No. 12/129,106 and PCT Application No. PCT/US2009/056220, the entire content of each of which is incorporated herein by reference.

Chain transfer agents for use with methods of the present invention include, but are not limited to, carboxylic acids, alcohols, dicarboxylic acids, diols, poly acids, polyols, and their deprotonated forms In certain embodiments, the chain transfer agent in the quenching step is present in an amount from about 0.001% to about 2% by mass with respect to the total amount of the polycarbonate chain.

In certain embodiments, the quenching step comprises adding a ligand that is not a polymerization initiator, wherein the added ligand has a higher affinity for the transition metal of the transition metal-ligand complex than does either a product polycarbonate chain, or an anion of the added chain transfer agent.

In certain embodiments, the ligand present in the quenching step is selected from a sulfonate salt (e.g., a sodium sulfonate salt), or another non-nucleophilic anion along with water, an alcohol, a carboxylic acid or a combination of two or more of these.

In certain embodiments, the ligand present in the quenching step is added to the reaction mixture in an amount of less than 10 equivalents relative to the amount of catalytic transition metal-ligand complex present in the reaction mixture.

In certain embodiments, the ligand present in the quenching step is added to the reaction mixture in an amount of between 0.1 and 10 equivalents relative to the amount of catalytic transition metal-ligand complex present in the reaction mixture.

In certain embodiments, the ligand present in the quenching step is added to the reaction mixture in an amount of between 0.1 and 2 equivalents relative to the amount of catalytic transition metal-ligand complex present in the reaction mixture.

In certain embodiments, the ligand present in the quenching step is added to the reaction mixture in an amount of between 1 and 2 equivalents relative to the amount of catalytic transition metal-ligand complex present in the reaction mixture.

In certain embodiments, the ligand present in the quenching step is added to the reaction mixture in an amount of about 1 equivalent relative to the amount of catalytic transition metal-ligand complex present in the reaction mixture.

In certain embodiments, the quenching step is performed at a temperature in the range of about −20° C. to about 70° C.

In certain embodiments, the quenching step is performed at a temperature in the range of about 0° C. to about 50° C.

In certain embodiments, the quenching step is performed at a temperature in the range of about 10° C. to about 30° C.

In certain embodiments, the quenching step is performed at room temperature.

In one aspect, the present disclosure provides a method which includes an initiating step for an aliphatic polycarbonate polymerization reaction by combining an epoxide with carbon dioxide in the presence of a catalytic transition metal-ligand complex to form a reaction mixture comprising a polycarbonate chain, wherein the polymerization reaction is performed in a reactor, the method further comprising: depressurizing the reactor containing the reaction mixture, removing excess carbon dioxide from the reactor, and diluting the reaction mixture by adding a solvent prior to the quenching step.

In certain embodiments, additional heat is applied to the reactor after the quenching step is performed.

In certain embodiments, additional heat applied to the reactor after the quenching step is performed, results in removal of excess epoxide that may be present.

EXAMPLES

Example 1

Acetic Acid Quench Tests in Vials

Figure 2:
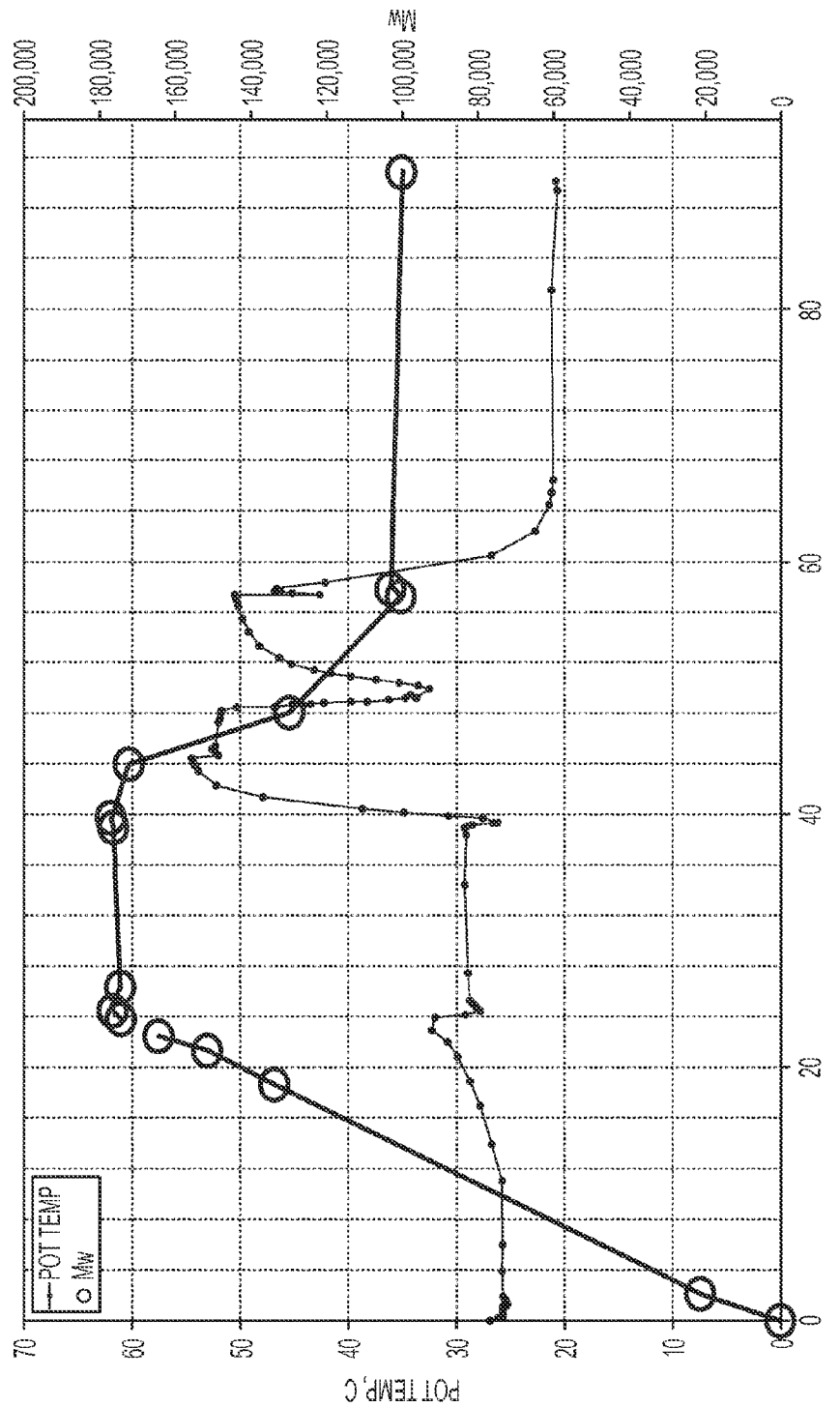
FIG. 2 depicts a graph of the molecular weight change of a poly(propylene carbonate) solution after performing a quench and a dilute step in a 2-gallon reactor.

Background:

During a large scale synthesis of PPC (in a 400-gallon reactor) of making PPC, the polymerization was successful but breakdown of molecular weight was observed after the quench and dilute step of the process (see FIG. 1). The same was then observed in a smaller scale reaction (2-gallon reactor) (see FIG. 2). More attention was directed to understanding the quenching step of the process. Particular focus was placed on understanding t the thermal stability of the polymer after the quench.

Procedure:

A. A PPC polymerization was conducted in the 2-gallon reactor. When the molecular weight (as determined via GPC) had reached the target, 200 grams of the dope was withdrawn from the pot and diluted with 200 grams of propyl acetate. The composition of the dope at this point was approximately 50 wt % propyl acetate, 30 wt % propylene oxide, and 20 wt % PPC polymer.

B. A sample of this diluted dope was withdrawn and prepared for GPC analysis. C. 8 grams of dope was poured into each of four 20-mL scintillation vials, and a magnetic stir bar added.

D. Various amounts of acetic acid were added to the vials, and the vials were stirred overnight (17 hours) at 80 OC on a reaction block. The acid additions were as follows:

Control: no acetic acid

1/10-quench: 8 molar equivalents of AcOH relative to catalyst

Regular quench: 80 molar equivalents of AcOH relative to catalyst

10× quench: 800 molar equivalents of AcOH relative to catalyst

Results:

Original diluted dope, before exposure to heat: $M_w$=249,904 (orange/yellow) After 17 hours at 80 C: Control (no acetic acid): $M_w$=134,892 (deep red/orange)

1/10-quench: $M_w$=137,523 (deep red/orange)

Regular quench: $M_w$=24,326 (orange/yellow)

10× quench: $M_w$=241,897 (pale yellow)

Figure 3:
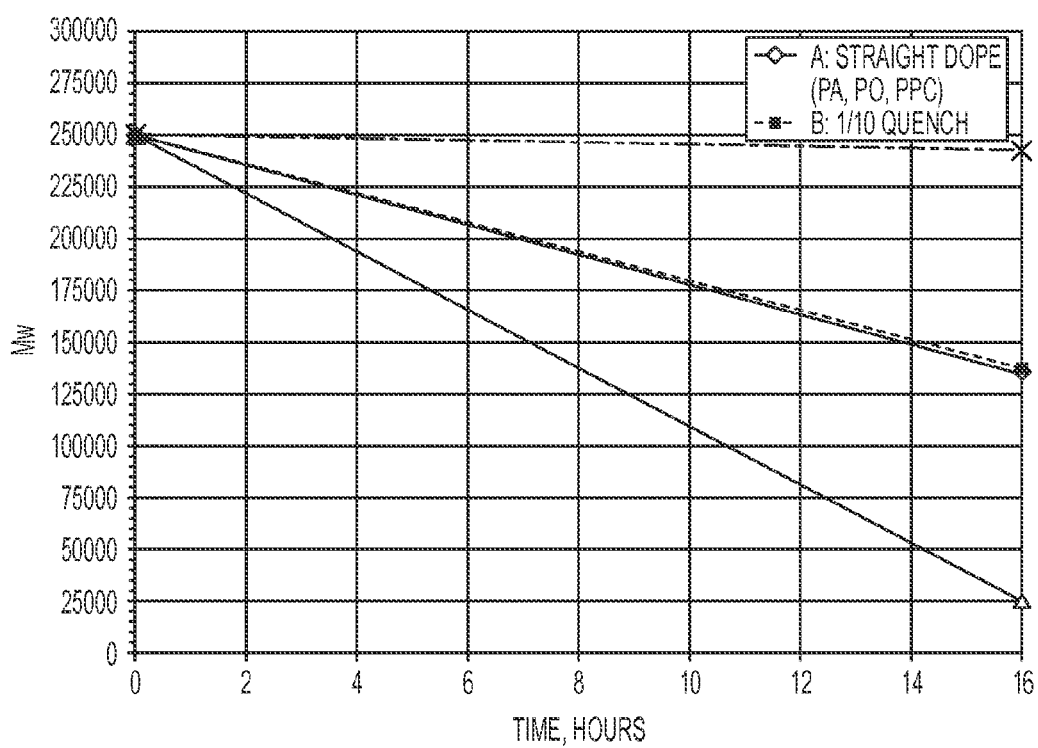
FIG. 3 depicts a graph of the molecular weight change of a poly(propylene carbonate) solution after exposure of: (a) a control containing (n-propyl acetate (pa), propylene oxide and poly(propylene carbonate, and no acetic acid; (b) a solution containing 8 molar equivalents of acetic acid relative to catalyst amount; (c) a solution containing 80 molar equivalents of acetic acid relative to catalyst amount; and (d) a solution containing 800 molar equivalents of acetic acid relative to catalyst amount, to 80° C heat for 17 hours.

Also see FIG. 3.

The polydispersity index (PD) reported as part of the GPC analysis is also an indication of polymer degradation. The PD of the control was 1.3, as also was the "10×" stable sample. However, the other samples that showed degradation of MW also showed a PD increase to 1.6 or more.

Figure 7:
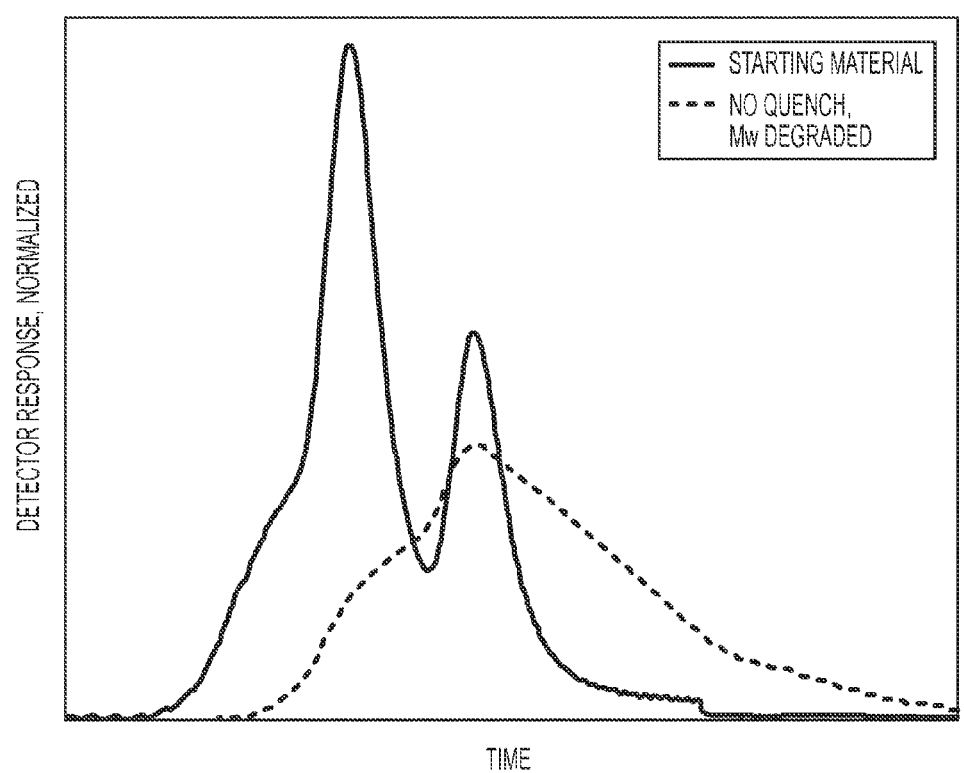
FIG. 7 depicts a preparative GPC (gel permeation chromatography) graph illustrating a change in the shape of the GPC trace of a PPC solution relative to the control, wherein higher molecular weight fractions (those eluting earlier) disappear in the population, and lower molecular weight fractions increase, with an overall broadening of the curve.

Conclusions:

The only sample that did not exhibit significant breakdown in MW was the 10× quench vial (800 molar equivalents AcOH relative to catalyst). In order to produce a dope that is thermally stable with regard to molecular weight in this experiment, a significant excess of this quench agent must be present. In all cases, polymer degradation was indicated by a combination of three factors:

a) significant (>10%) reduction of MW relative to the control b) concomitant increase in polydispersity relative to the control c) change in the shape of the GPC trace relative to the control, illustrating the disappearance of higher molecular weight fractions of the population, and an increase in lower molecular weight fractions, with an overall broadening of the curve (see FIG. 7).

Example 2

Two Additional Acetic Acid Quench Tests in Vials

These experiments were conducted in similar fashion to the previous experiment, to repeat and further develop the results of the previous experiment.

Figure 4:
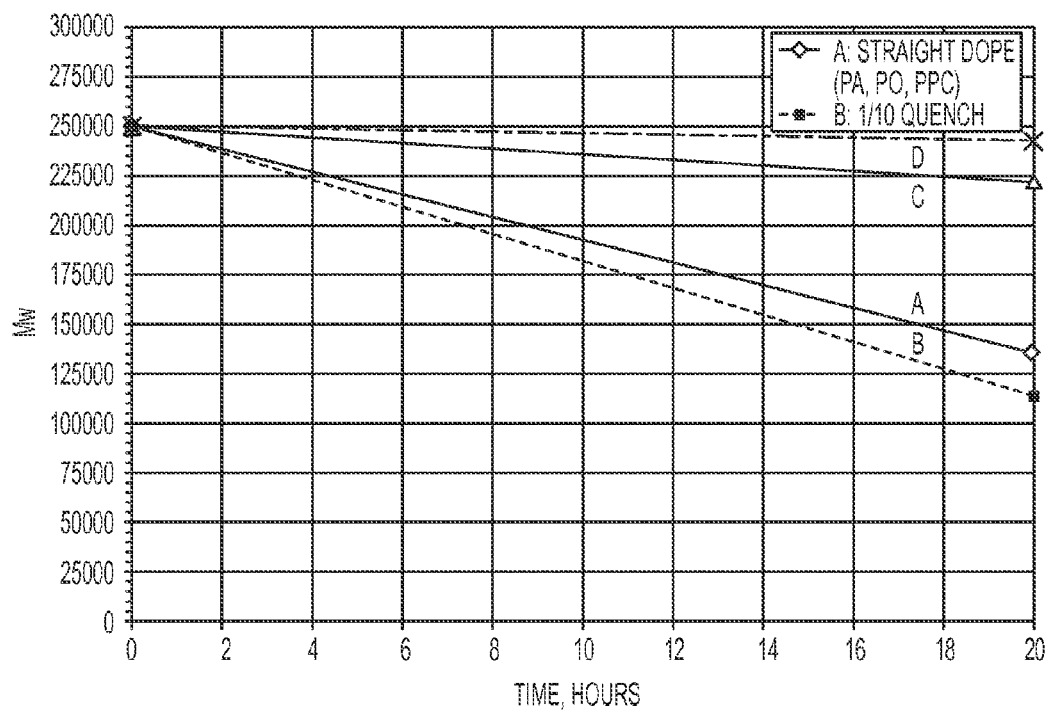
FIG. 4 depicts a graph of the molecular weight change after exposure of: (a) a control containing n-propyl acetate (pa), propylene oxide and poly(propylene carbonate, and no acetic acid; (b) a solution containing 8 molar equivalents of acetic acid relative to catalyst amount; (c) a solution containing 80 molar equivalents of acetic acid relative to catalyst amount; and (d) a solution containing 80 molar equivalents of acetic acid relative to catalyst amount, to 80° C. heat for 17 hours.
Figure 5:
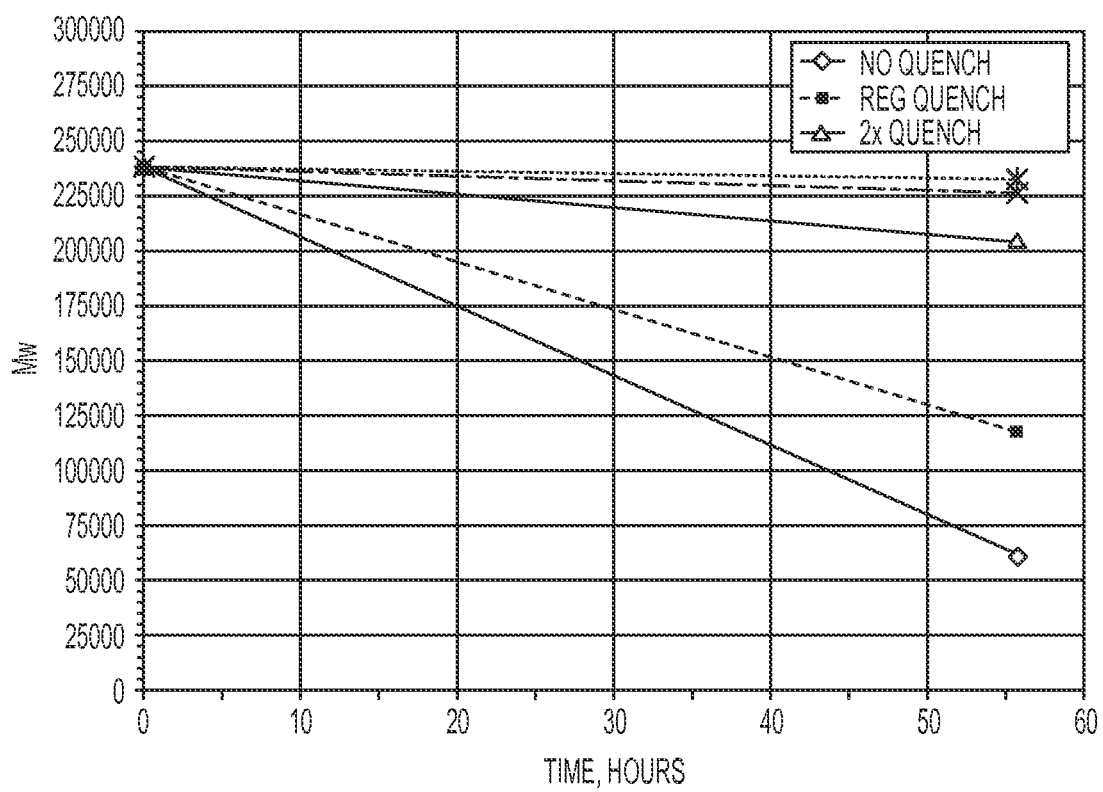
FIG. 5 depicts a graph of the molecular weight change after exposure of: (a) a control containing propyl acetate, propylene oxide and poly(propylene carbonate, and no acetic acid; (b) a solution containing 80 molar equivalents of acetic acid relative to catalyst amount; (c) 160 molar equivalents of acetic acid relative to catalyst amount; (d) a solution containing 480 molar equivalents of acetic acid relative to catalyst amount; and (e) a solution containing 800 molar equivalents of acetic acid relative to catalyst amount, to 80° C heat for 17 hours.

Results:

See FIG. 4; and FIG. 5.

Conclusions:

PPC dope that is unquenched or under-quenched with acetic acid will exhibit MW breakdown when exposed to heat. However, when 500-800 molar equivalents of AcOH are present, the MW is stable. Therefore, the breakdown in MW seen in large scale reactions and at laboratory scale resulted from insufficient quenching of the polymer dope. That is, the catalyst remained in such a state of activity that under the proper conditions it would catalyze the depolymerization of the PPC chains. Not wishing to be bound by theory, a hypothesis to explain this was that the acetic acid was not disabling the catalyst, but rather "tying it up" or "keeping it busy" by acting as a chain transfer agent. In excess, this type of interaction will effectively keep the active catalyst from binding polymer chains, thereby protecting them from degradation. Likewise, insufficient excess of acetic acid will leave some catalyst available to act upon polymer chains.

Example 3

Large Scale Reaction with 10× Acetic Acid Quench

Figure 6:
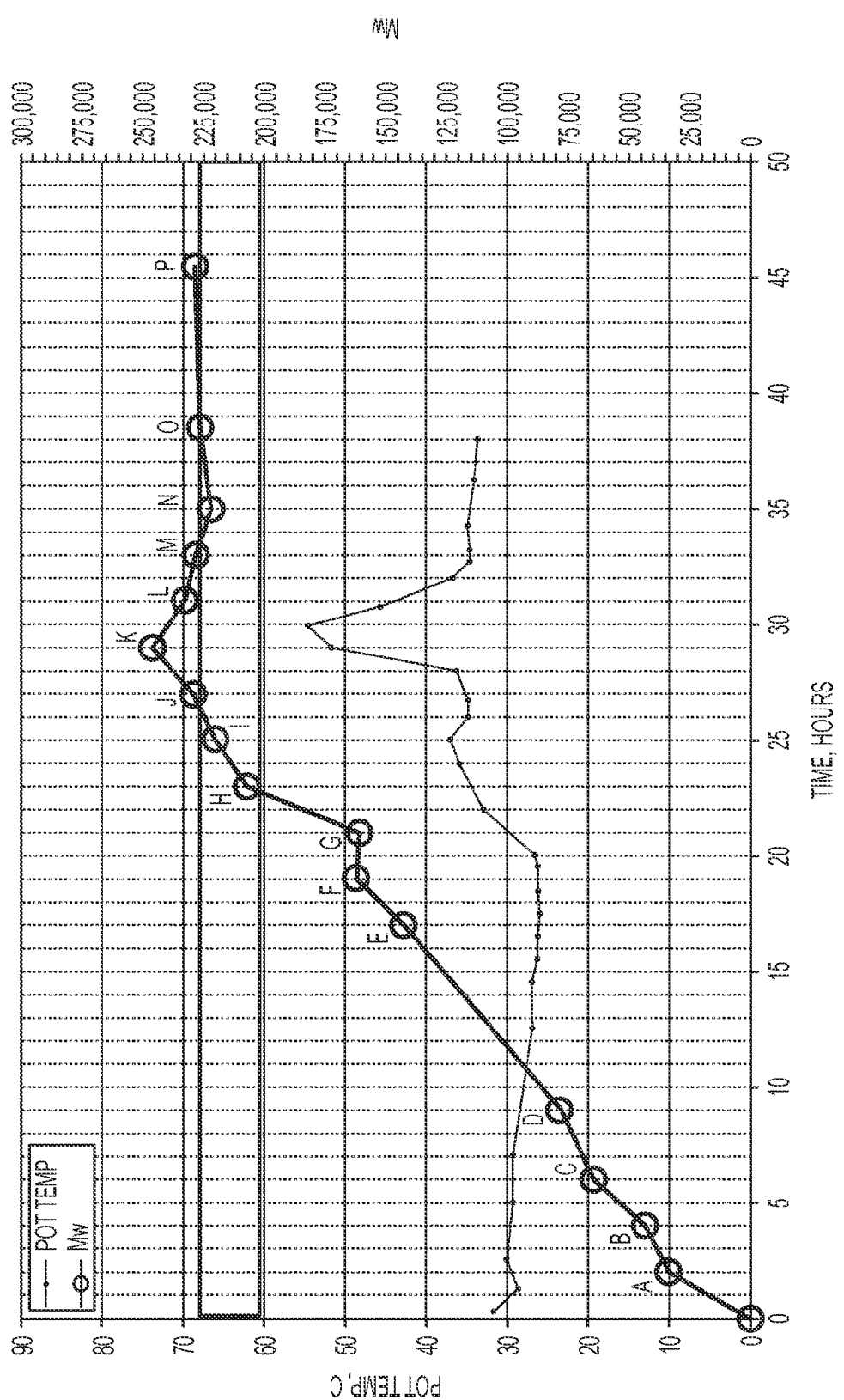
FIG. 6 depicts a graph of the molecular weight change of a PPC solution containing 800 molar equivalents of acetic acid after performing a quench and a dilute step in a 400-gallon reactor.

The previously discussed vial experiments were repeated several times with consistent results. With confidence that more acetic acid would produce a thermally stable polymer dope, a second large scale reaction (400-gallon reactor) was conducted. This time, the MW after the quench was stable. See FIG. 6.

Example 4

Alternate Acid Quench Agents

Background:
Other acidic quench agents, namely para-toluenesulfonic acid (pTSA), methanesulfonic acid (MSA), and trifluoromethanesulfonic acid ("triflic") were screened to determine their effectiveness as quench agents.

Procedure:
A. PPC polymer was prepared in a pressurized reactor as previously described, then diluted with propyl acetate to yield a dope of approximately 50 wt % propyl acetate, 30 wt % propylene oxide, and 20 wt % PPC polymer.

B. A solution of pTSA was prepared in propyl acetate, and added to dope in vials to yield pTSA loadings of 0, 0.1, 0.5, 1.0, and 2.0 molar equivalents pTSA relative to catalyst.

C. The vials were stirred on an 80° C. reaction block for 15 hours, and then samples prepared for GPC analysis.

D. Likewise, vials of dope were prepared and charged with 1 and 2 molar equivalents each of MSA, pTSA, and triflic acid. These vials were also stirred overnight at 80° C. and analyzed later for molecular weight.

Figure 8:
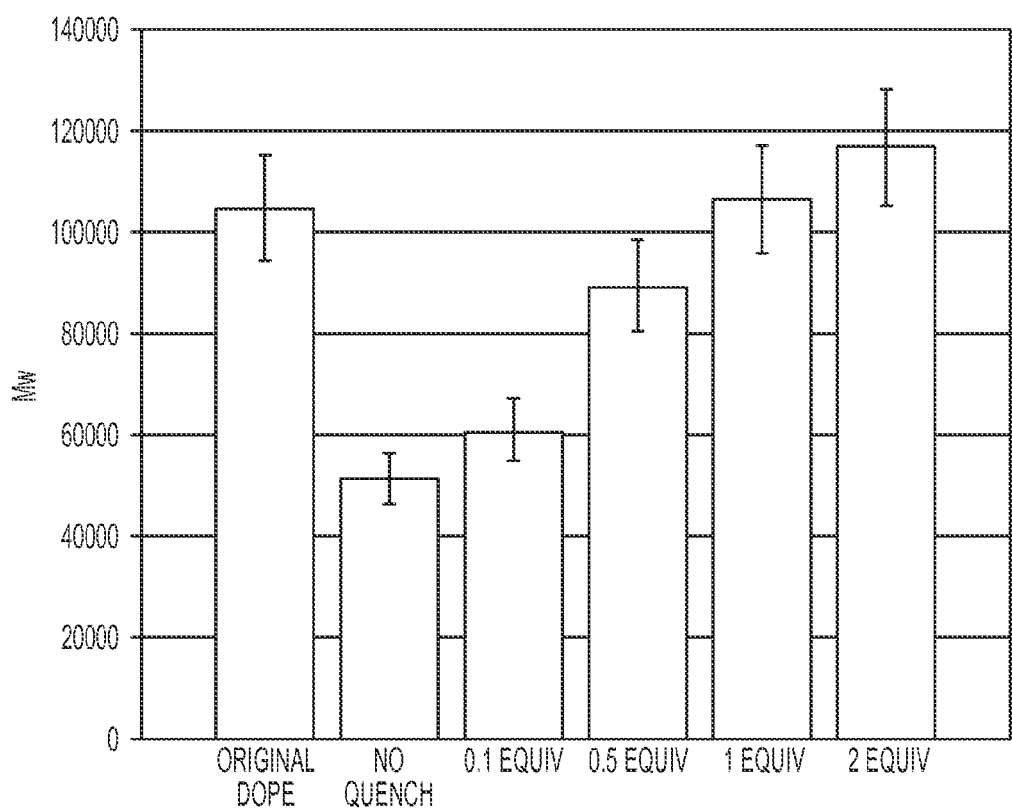
FIG. 8 depicts a bar graph showing the molecular weight change of stored polymer dope quenched by the addition of between 0 and 2 molar equivalents of p-toluene sulfonic acid relative to the catalyst amount used.

Results:
See FIG. 8. The addition of 1 and 2 molar equivalents relative to catalyst of pTSA led to thermally stable PPC dope. Vials with lesser amounts of pTSA exhibited polymer degradation, as did the control.

Figure 9:
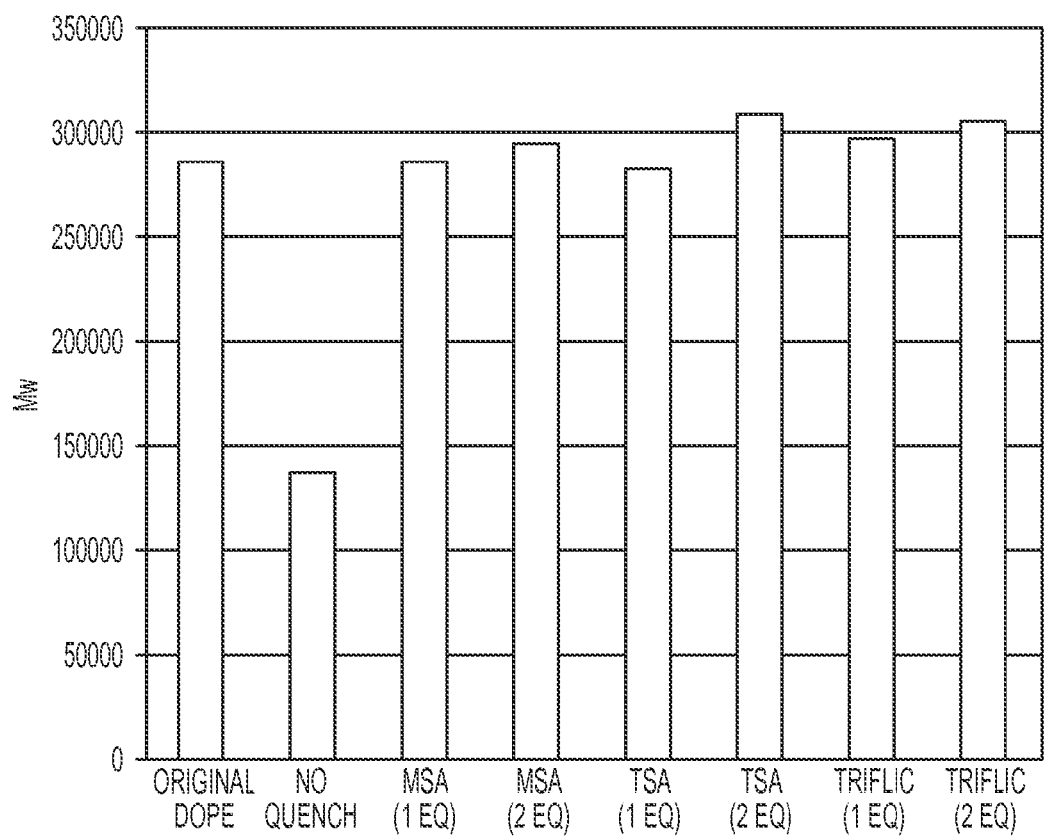
FIG. 9 depicts a bar graph showing the molecular weight change of stored polymer dope quenched by the addition of 1 or 2 molar equivalents of several different sulfonic acids relative to the catalyst amount used.

See FIG. 9. Each of the acids tested resulted in stable polymer dope.

Conclusion:
pTSA, MSA, and triflic acid are effective quench agents for the catalyst, with just 1 molar equivalent relative to catalyst. This is especially significant in contrast to the 800 molar equivalents of acetic acid previously required to produce thermally stable polymer dope. In theory, these acids actually bind the catalyst and disable it, thereby effectively preventing the catalyst from interacting with polymer chains as described above.

EQUIVALENTS

All material cited in this application, including, but not limited to, patents and patent applications, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

The section headings used herein are for organizational purposes only and are not to be construed as limiting the subject matter described in any way.

While the present disclosure has been described in conjunction with various embodiments and examples, it is not intended that the present disclosures be limited to such embodiments or examples. On the contrary, the present disclosure encompasses various alternatives, modifications, and equivalents, as will be appreciated by those of skill in the art.

While the present disclosure has been particularly shown and described with reference to specific illustrative embodiments, it should be understood that various changes in form and detail may be made without departing from the spirit and scope of the present disclosure. Therefore, all embodiments that come within the scope and spirit of the present disclosure, and equivalents thereto, are intended to be claimed. The claims and descriptions of the present disclosure should not be read as limited to the described order of elements unless otherwise stated.

We claim:

1. A method comprising:
   initiating an aliphatic polycarbonate polymerization reaction by combining an epoxide with carbon dioxide in the presence of a catalytic transition metal-ligand complex to form a reaction mixture comprising a polycarbonate chain, wherein the catalytic transition metal-ligand complex comprises at least one ligand that is a polymerization initiator and at least one ligand that is not a polymerization initiator; and
   quenching the polymerization reaction by contacting the reaction mixture with an acid containing an anion that is not a polymerization initiator.

2. The method of claim 1, wherein the ligand that is a polymerization initiator is a nucleophilic ligand.

3. The method of claim 2, wherein the nucleophilic ligand is selected from the group consisting of —OR$^x$, —O(C=O)R$^x$, —NC, —CN, halo, —Br, —I, —Cl, and —N$_3$, wherein each R$^x$ is, independently, selected from hydrogen, optionally substituted aliphatic, optionally substituted heteroaliphatic, optionally substituted aryl and optionally substituted heteroaryl.

4. The method of claim 3, wherein R$^x$ is selected from the group consisting of optionally substituted aliphatic, optionally substituted heteroaliphatic, optionally substituted aryl, and optionally substituted heteroaryl.

5. The method of claim 1, wherein the ligand that is not a polymerization initiator is a salen ligand.

6. The method of claim 5, wherein the salen ligand is selected from the group consisting of:

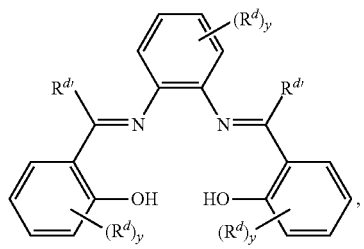

-continued

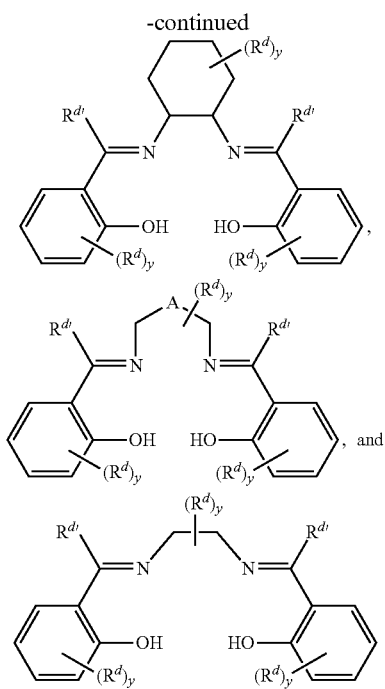

wherein:
$R^d$ at each occurrence is independently selected from the group consisting of a —$\sim\sim$ (Z')$_m$ group, optionally substituted $C_1$-$C_{20}$ aliphatic, optionally substituted $C_1$-$C_{20}$ heteroaliphatic, optionally substituted 6- to 14-membered aryl, optionally substituted 5- to 14-membered heteroaryl, halogen, —OR$^{10}$, —OC(O)R$^{13}$, —OC(O)OR$^{13}$, —OC(O)NR$^{11}$R$^{12}$, —CN, —CNO, —C(O)R$^{13}$, —C(R$^{13}$)$_z$H$_{(3-z)}$, —C(O)OR$^{13}$, —C(O)NR$^{11}$R$^{12}$, —NR$^{11}$, R$^{12}$, —N$^+$(R$^{11}$)$_3$, —NR$^{11}$C(O)R$^{10}$, —NR$^{11}$C(O)OR$^{13}$, —NR$^{11}$SO$_2$R$^{13}$, —NCO, —N$_3$, —NO$_2$, —S(O)$_x$R$^{13}$m, —SO$_2$NR$^{11}$R$^{12}$, —NO$_2$, —C(R$^{13}$)$_z$H$_{(3-z)}$, —(CH$_2$)$_k$R$^{14}$, —(CH$_2$)$_k$—Z—R$^{16}$—, and —(CH$_2$)$_k$—Z—(CH$_2$)$_m$—R$^{14}$, where two or more suitable $R^d$ groups can be taken along with intervening atoms to form one or more rings;
$R^{d_1}$ at each occurrence is independently selected from the group consisting of —H, $C_1$-$C_{12}$ alkyl, $C_2$-$C_{12}$ alkenyl, $C_2$-$C_{12}$ alkynyl, —CN, —CNO, —C(O)R$^{13}$, —C(R$^{13}$)$_z$H$_{(3-z)}$, —C(O)OR$^{13}$, —C(O)NR$^{11}$R$^{12}$, —C(R$^{13}$)$_z$H$_{(3-z)}$, —(CH$_2$)$_k$R$^{14}$, —(CH$_2$)$_k$—Z—R$^{16}$—, —(CH$_2$)$_k$—Z—(CH$_2$)$_m$—R$^{14}$, where two or more suitable $R^{d_1}$ groups can be taken along with intervening atoms to form one or more rings;
A is a divalent linker selected from the group consisting of —O—, —S(O)$_x$—, —(CH$_2$)—, —C(O)—, —C(=NOR$^{10}$)—, —(C(R$^{14}$)$_x$H$_{(2-x)}$)$_k$—, a $C_3$ to $C_8$ substituted or unsubstituted carbocycle, and a $C_1$-$C_8$ substituted or unsubstituted heterocycle;
$R^{10}$ at each occurrence is independently selected from the group consisting of —H, —C(R$^{13}$)$_z$H$_{(3-z)}$, $C_1$-$C_{12}$ alkyl, $C_2$-$C_{12}$ alkenyl, $C_2$-$C_{12}$ alkynyl, up to a $C_{12}$ carbocycle, up to a $C_{12}$ heterocycle, —S(O)$_2$R$^{13}$; —Si(R$^{15}$)$_3$, and a hydroxyl protecting group;
$R^{11}$ and $R^{12}$ at each occurrence are independently selected from the group consisting of —H, optionally substituted $C_1$-$C_{20}$ aliphatic, optionally substituted $C_1$-$C_{20}$ heteroaliphatic, optionally substituted 6- to 14-membered aryl, optionally substituted 5- to 14-membered heteroaryl, and —C(R$^{13}$)$_z$H$_{(3-z)}$; wherein $R^{11}$ and $R^{12}$ when both present can optionally be taken together with the atom to which they are attached to form a 3-10-membered ring;
$R^{13}$ at each occurrence is an optionally substituted moiety independently selected from the group consisting of: —H, optionally substituted $C_1$-$C_{20}$ aliphatic, optionally substituted $C_1$-$C_{20}$ heteroaliphatic, optionally substituted 6-14-membered aryl, optionally substituted 5-14-membered heteroaryl;
$R^{14}$ at each occurrence is independently selected from the group consisting of halogen, —OR$^{10}$, —OC(O)R$^{13}$, —OC(O)—OR$^{13}$, —OC(O)NR$^{11}$R$^{12}$, —CN, —CNO, —C(R$^{13}$)$_z$H$_{(3-z)}$, —C(O) R$^{13}$, —C(O)OR$^{13}$, —C(O)NR$^{11}$R$^{12}$, —NR$^{11}$R$^{12}$, —NR$^{11}$C(O)R$^{13}$, —NR$^{11}$C(O)OR$^{10}$, —NR$^{11}$SO$_2$R$^{13}$, —NCO, —N$_3$, —NO$_2$, —S(O)$_x$R$^{13}$, —SO$_2$NR$^{11}$R$^{12}$, up to a $C_{12}$ heterocycle, and up to a $C_{12}$ carbocycle;
$R^{15}$ at each occurrence is independently selected from the group consisting of $C_1$-$C_6$ alkyl, $C_2$-$C_6$ alkenyl, $C_2$-$C_6$ alkynyl, and up to $C_{12}$ substituted or unsubstituted carbocyclic;
$R^{16}$ at each occurrence is independently selected from the group consisting of $C_1$-$C_{12}$ alkyl, $C_2$-$C_{12}$ alkenyl, $C_2$-$C_{12}$ alkynyl, up to $C_{12}$ heterocylic, up to $C_{12}$ carbocyclic, and —C(R$^{13}$)$_z$H$_{(3-z)}$;
Z is a divalent linker selected from the group consisting of —(CH=CH)$_a$—, —(CH=CH)$_a$—, —C(O)—, —C(=NOR$^{11}$)—, —C(=NNR$^{11}$R$^{12}$)—, —O—, —N(R$^{11}$)—, —N(C(O)R$^{13}$)—, —S(O)$_x$, a polyether, and a polyamine;
a is 1, 2, 3, or 4;
—$\sim\sim$ (Z')$_m$ represents one or more independently-defined co-catalyst moieties linked to the ligand via a covalent tether, wherein:
each Z' independently represents a moiety selected from the group consisting of ammonium salts, phosphonium salts, arsonium salts, guanidinium salts, azonium salts, amino groups, phosphine groups, guanidine groups, amidine groups, heterocyclic groups and heteroaryl groups;
m is an integer from 1 to 4, inclusive and represents the number of Z' groups present on the tether; and
—$\sim\sim$ represents a covalent tether consisting of one or more atoms;
k is an integer from 1 to 8 inclusive;
x is 0, 1, or 2;
y is 0, 1, 2, 3, or 4; and
z is 1, 2, or 3.

7. The method of claim 6, wherein the catalytic transition metal complex is selected from the group consisting of:

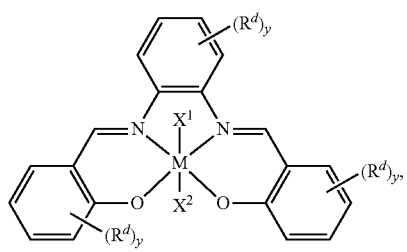

-continued

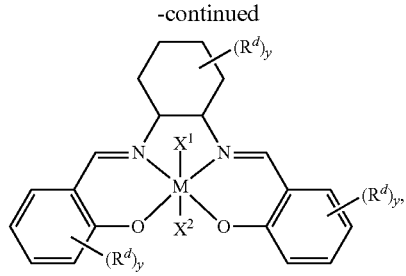

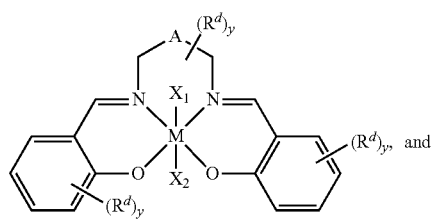

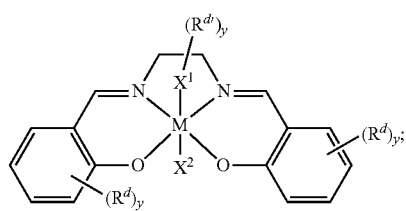

wherein, M is the metal atom, and as valency permits, one or both of $X^1$ and $X^2$ are present and each are independently selected from the group consisting of —$OR^x$, —$O(C\!=\!O)R^x$, —NC, —CN, halo, and —$N_3$, wherein each $R^x$ is, independently, selected from hydrogen, optionally substituted aliphatic, optionally substituted heteroaliphatic, optionally substituted aryl and optionally substituted heteroaryl.

8. The method of claim 7, wherein the catalytic transition metal complex is selected from the group consisting of:

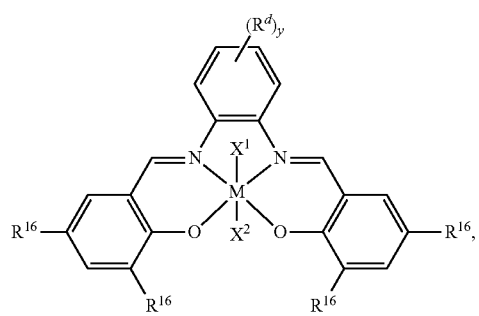

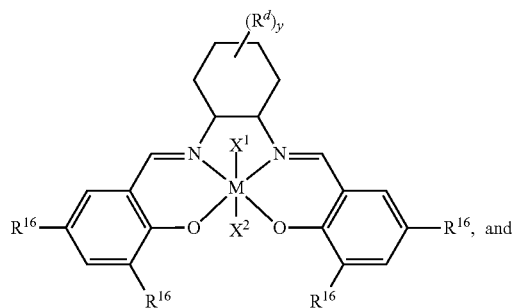

-continued

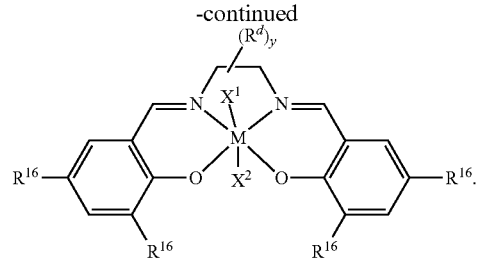

9. The method of claim 8, wherein the catalytic transition metal complex is selected from the group consisting of:

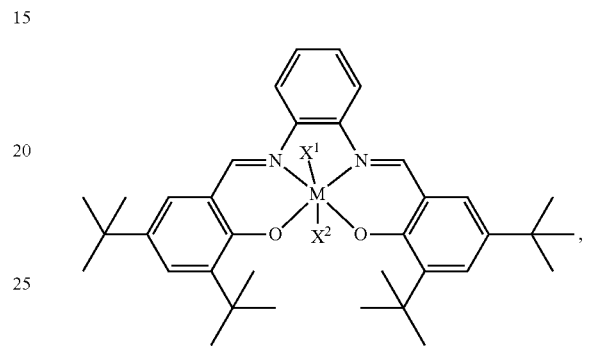

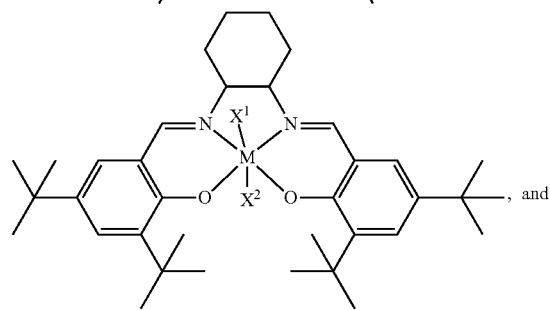

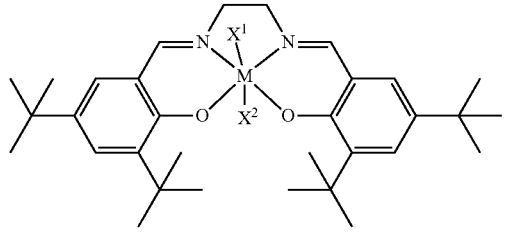

wherein, M is the transition metal.

10. The method of claim 1, wherein the anion is non-nucleophilic.

11. The method of claim 1, wherein the acid is a sulfonic acid.

12. The method of claim 11, wherein the sulfonic acid has the formula $R^1SO_3H$ where $R^1$ is a radical selected from the group consisting of: optionally substituted aliphatic, optionally substituted aryl, and optionally substituted heterocyclic.

13. The method of claim 12, wherein $R^1$ is selected from the group consisting of optionally substituted $C_1$ to $C_{20}$ alkyl, $C_1$ to $C_{20}$ alkenyl, and optionally substituted phenyl.

14. The method of claim 12, wherein the sulfonic acid is selected from the group consisting of ρ-toluene sulfonic acid, methane sulfonic acid, ethane sulfonic acid, 1-propane sulfonic acid, trifluoromethyl sulfonic acid, 4-nitrophenyl sulfonic acid, sulfoacetic acid, cumenesulphonic acid, xylene sulfonic acid, 3-amino-1-propanesulfonic acid, 2-(methylamino)ethanesulfonic acid, 2-aminoethanesulfonic acid, 2-sulfanylethanesulfonic acid, 3-hydroxy-1-propanesulfonic acid, benzenesulfonic acid, 3-Pyridinesulfonic acid, 2-pyridinesulfonic acid, 4-piperidinesulfonic acid, 2-aminobenzenesulfonic acid, 1-methylpyridinium 3-sulfonate, 1-methyl-2-pyridiniumsulfonate, 4-hydroxybenzenesulfonic acid, cyclohexane sulfonic acid, 4-ethylbenzenesulfonic acid, 2,5-dimethylbenzenesulfonic acid, 4-methylmetanilic acid, 4-amino-3-methylbenzenesulfonic acid, 1-Naphthalenesulfonic acid, 2-amino-5-methylbenzenesulfonic acid, and perfluorooctane sulfonic acid.

15. The method of claim 14, wherein the sulfonic acid is p-toluene sulfonic acid.

16. The method of claim 1, wherein the acid is a sulfamic acid derivative.

17. The method of claim 16, wherein the sulfamic acid derivative has the formula $R^1R^2N-SO_3H$, where $R^1$ and $R^2$ are radicals independently selected from the group consisting of: —H; optionally substituted alkyl; optionally substituted aryl; and optionally substituted heterocyclic and $R^1$ and $R^2$ may optionally be taken together with intervening atoms to form an optionally substituted ring.

18. The method of claim 1, wherein the acid is a phosphoric acid derivative having at least one acidic hydrogen atom.

19. The method of claim 18, wherein the phosphoric acid derivative is selected from the group consisting of phosphoric acid, pyrophosphoric acid, triphosphoric acid, an alkyl derivative of phosphoric acid, pyrophosphoric acid, or triphosphoric acid, an aryl derivative of phosphoric acid, pyrophosphoric acid, or triphosphoric acid, and a mixture of any two or more thereof.

20. The method of claim 18, wherein the phosphoric acid derivative has the formula:

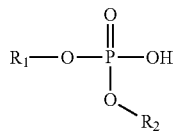

where $R^1$ and $R^2$ are radicals independently selected from the group consisting of hydrogen, a monophosphate group, a diphosphate group, an optionally substituted alkyl, an optionally substituted aryl, an optionally substituted heterocyclic, an ester derivative of a monophosphate group, and an ester derivative of a diphosphate group.

21. The method of claim 1, wherein the transition metal is a Group 6 transition metal.

22. The method of claim 21, wherein the transition metal is chromium or molybdenum.

23. The method of claim 1, wherein the transition metal is a Group 7 transition metal.

24. The method of claim 23, wherein the transition metal is manganese.

25. The method of claim 1, wherein the transition metal is a Group 9 transition metal.

26. The method of claim 25, wherein the transition metal is cobalt.

27. The method of claim 1, wherein the transition metal is a Group 12 transition metal.

28. The method of claim 1, wherein less than 10 equivalents of the acid are added to the reaction mixture relative to the amount of catalytic transition metal-ligand complex present in the reaction mixture.

29. The method of claim 1, wherein between 0.1 and 10 equivalents of the acid are added to the reaction mixture relative to the amount of catalytic transition metal-ligand complex present in the reaction mixture.

30. The method of claim 1, wherein between about 0.1 and about 2 equivalents of the acid are added to the reaction mixture relative to the amount of catalytic transition metal-ligand complex present in the reaction mixture.

31. The method of claim 1, wherein between 1 and 2 equivalents of the acid are added to the reaction mixture relative to the amount of catalytic transition metal-ligand complex present in the reaction mixture.

32. The method of claim 1, wherein about 1 equivalent of the acid is added to the reaction mixture relative to the amount of catalytic transition metal-ligand complex present in the reaction mixture.

33. The method of claim 1, wherein the epoxide is selected from the group consisting of ethylene oxide, monosubstituted alkyl epoxides, 1,2 disubstituted alkyl epoxides, 1,1-disubstituted epoxides, and polycyclic epoxides.

34. The method of claim 1, wherein the epoxide is selected from the group consisting of ethylene oxide, propylene oxide, epichlorohydrin, glycidyl ethers, glycidyl esters, 1,2-butylene oxide, 2,3-butylene oxide, cyclopentene oxide, cyclohexene oxide, cyclooctene oxide, norbornene oxide, a glycidyl ether, and limonene oxide.

35. The method of claim 1, wherein the epoxide is propylene oxide.

36. The method of claim 1, wherein the polymerization reaction is performed in a reactor, the method further comprising:
depressurizing the reactor containing the reaction mixture;
removing excess carbon dioxide from the reactor; and
diluting the reaction mixture by adding a solvent prior to the quenching step.

37. The method of claim 1, wherein the epoxide is ethylene oxide.

* * * * *